(12) United States Patent
Braedt et al.

(10) Patent No.: US 10,981,626 B2
(45) Date of Patent: Apr. 20, 2021

(54) DRIVE ARRANGEMENT FOR A BICYCLE

(71) Applicant: SRAM DEUTSCHLAND GmbH, Schweinfurt (DE)

(72) Inventors: Henrik Braedt, Hambach (DE); Joachim Hanke, Niederwerrn (DE)

(73) Assignee: SRAM DEUTSCHLAND GMBH, Schweinfurt (DE)

(*) Notice: Subject to any disclaimer, the term of this patent is extended or adjusted under 35 U.S.C. 154(b) by 622 days.

(21) Appl. No.: 15/926,826

(22) Filed: Mar. 20, 2018

(65) Prior Publication Data

US 2019/0291818 A1 Sep. 26, 2019

(51) Int. Cl.

| | | |
|---|---|---|
| *B62M 9/125* | (2010.01) | |
| *B62M 1/36* | (2013.01) | |
| *F16G 13/06* | (2006.01) | |
| *F16H 55/30* | (2006.01) | |
| *B62M 9/04* | (2006.01) | |
| *B62M 9/121* | (2010.01) | |
| *B62M 9/12* | (2006.01) | |

(Continued)

(52) U.S. Cl.
CPC .............. *B62M 9/125* (2013.01); *B62M 1/36* (2013.01); *B62M 9/04* (2013.01); *B62M 9/06* (2013.01); *B62M 9/10* (2013.01); *B62M 9/105* (2013.01); *B62M 9/12* (2013.01); *B62M 9/121* (2013.01); *F16G 13/06* (2013.01); *F16H 55/30* (2013.01); *B62M 2009/005* (2013.01)

(58) Field of Classification Search
CPC ...... B62M 9/121; B62M 9/122; B62M 9/124; B62M 9/1242; B62M 9/1244; B62M 9/125; B62M 2009/12406; B62M 9/00; B62M 9/02; B62M 9/04; B62M 9/06; B62M 9/12; B62M 9/10; B62M 9/105; B62M 2009/005; F16H 55/30
See application file for complete search history.

(56) References Cited

U.S. PATENT DOCUMENTS

| | | | | |
|---|---|---|---|---|
| 3,903,751 A | * | 9/1975 | Dian .................... | B62M 9/1244 474/82 |
| 4,185,510 A | * | 1/1980 | Juy ..................... | B62M 9/1244 280/238 |

(Continued)

FOREIGN PATENT DOCUMENTS

| | | |
|---|---|---|
| DE | 202006003055 U1 | 9/2006 |
| DE | 102010032721 A1 | 1/2012 |

(Continued)

*Primary Examiner* — Michael R Mansen
*Assistant Examiner* — Raveen J Dias

(57) ABSTRACT

A drive arrangement for a bicycle includes a crank having a crank mounting portion, a front sprocket having a front sprocket mounting portion attached to the crank mounting portion and a front chain engaging portion, an axle assembly, a plurality of rear sprockets located about an axis of the axle assembly, a chain configured to engage with the front chain engaging portion of the front sprocket and the plurality of rear sprockets, a gear changer having a gear changer mounting unit located about the axis of the axle assembly and having a first mounting portion spaced apart from a second portion mounting portion. The gear changer is configured to move the chain between an axially innermost rear sprocket and an axially outermost rear sprocket and a control unit is configured to control movement of the gear changer.

14 Claims, 20 Drawing Sheets

(51) Int. Cl.
  *B62M 9/10* (2006.01)
  *B62M 9/06* (2006.01)
  *B62M 9/00* (2006.01)
  B62K 19/30 (2006.01)
  B62K 25/02 (2006.01)

(56) References Cited

U.S. PATENT DOCUMENTS

| | | | | |
|---|---|---|---|---|
| 4,504,250 | A * | 3/1985 | Juy | B62K 23/00 474/78 |
| 4,734,084 | A * | 3/1988 | Nagano | B62M 9/125 474/80 |
| 4,789,379 | A * | 12/1988 | Ozaki | B62M 9/1242 474/82 |
| 5,295,916 | A * | 3/1994 | Chattin | B62M 9/123 474/78 |
| 5,397,273 | A * | 3/1995 | Ando | B62M 9/1248 474/82 |
| 5,470,277 | A * | 11/1995 | Romano | B62M 9/122 474/110 |
| 5,494,307 | A * | 2/1996 | Anderson | B62M 9/122 280/236 |
| 5,624,335 | A * | 4/1997 | Ando | B62M 9/1242 474/80 |
| 5,919,106 | A * | 7/1999 | Ichida | B62M 9/125 474/82 |
| 6,162,140 | A * | 12/2000 | Fukuda | B62M 9/122 474/70 |
| 6,293,883 | B1 * | 9/2001 | Ichida | B62K 25/02 474/78 |
| 10,793,222 | B1 * | 10/2020 | Harris | B62M 9/1244 |
| 2004/0110586 | A1 * | 6/2004 | Shahana | B62M 9/125 474/80 |
| 2004/0116222 | A1 * | 6/2004 | Shahana | B62M 9/125 474/82 |
| 2004/0254038 | A1 * | 12/2004 | Chamberlain | B62M 9/12 474/144 |
| 2006/0058135 | A1 * | 3/2006 | Shahana | B62M 9/125 474/82 |
| 2006/0172831 | A1 * | 8/2006 | Wen | B62M 9/125 474/82 |
| 2006/0189424 | A1 | 8/2006 | Chamberlain et al. | |
| 2007/0021248 | A1 * | 1/2007 | Shahana | B62M 9/16 474/83 |
| 2007/0026985 | A1 * | 2/2007 | Yamaguchi | B62M 9/1242 474/82 |
| 2007/0216130 | A1 * | 9/2007 | Righi | B62M 9/124 280/210 |
| 2008/0272253 | A1 * | 11/2008 | Tseng | B62M 9/125 248/200 |
| 2009/0045601 | A1 * | 2/2009 | Colegrove | B62M 9/125 280/284 |
| 2010/0201097 | A1 * | 8/2010 | Schaffer | B62M 9/125 280/283 |
| 2013/0241175 | A1 * | 9/2013 | Talavasek | B62M 6/60 280/288.4 |
| 2016/0039494 | A1 | 2/2016 | Mikesell et al. | |
| 2016/0347409 | A1 * | 12/2016 | Watarai | B62M 9/02 |
| 2016/0362160 | A1 * | 12/2016 | Van Druten | B62M 11/16 |
| 2017/0113759 | A1 * | 4/2017 | Watarai | B62M 9/122 |
| 2017/0120983 | A1 * | 5/2017 | Komatsu | B62K 25/286 |
| 2017/0370462 | A1 * | 12/2017 | Akanishi | F16H 55/303 |
| 2018/0180157 | A1 * | 6/2018 | Akanishi | B62M 9/12 |
| 2018/0186429 | A1 * | 7/2018 | Nakamura | B62M 9/126 |
| 2018/0194431 | A1 * | 7/2018 | Iwai | F16H 55/06 |
| 2018/0202531 | A1 * | 7/2018 | Ooishi | F16H 55/30 |
| 2018/0265169 | A1 * | 9/2018 | Braedt | B62M 9/127 |
| 2018/0290712 | A1 * | 10/2018 | Taniguchi | F16H 55/30 |
| 2018/0347680 | A1 * | 12/2018 | Akanishi | B62M 9/02 |
| 2018/0354580 | A1 * | 12/2018 | Hara | B62M 1/36 |
| 2019/0031288 | A1 * | 1/2019 | Kamada | F16H 55/30 |
| 2019/0322333 | A1 * | 10/2019 | Braedt | B62K 25/02 |
| 2020/0062343 | A1 * | 2/2020 | Braedt | B62M 9/124 |
| 2020/0063850 | A1 * | 2/2020 | Tavares Miranda | B62M 9/06 |
| 2020/0298933 | A1 * | 9/2020 | Braedt | B62M 9/1242 |
| 2020/0339220 | A1 * | 10/2020 | Boehm | B62M 9/125 |

FOREIGN PATENT DOCUMENTS

| | | |
|---|---|---|
| EP | 0875444 A1 | 11/1998 |
| EP | 1342658 A1 | 9/2003 |
| EP | 1764297 A1 | 3/2007 |
| EP | 2301835 A1 | 3/2011 |

* cited by examiner

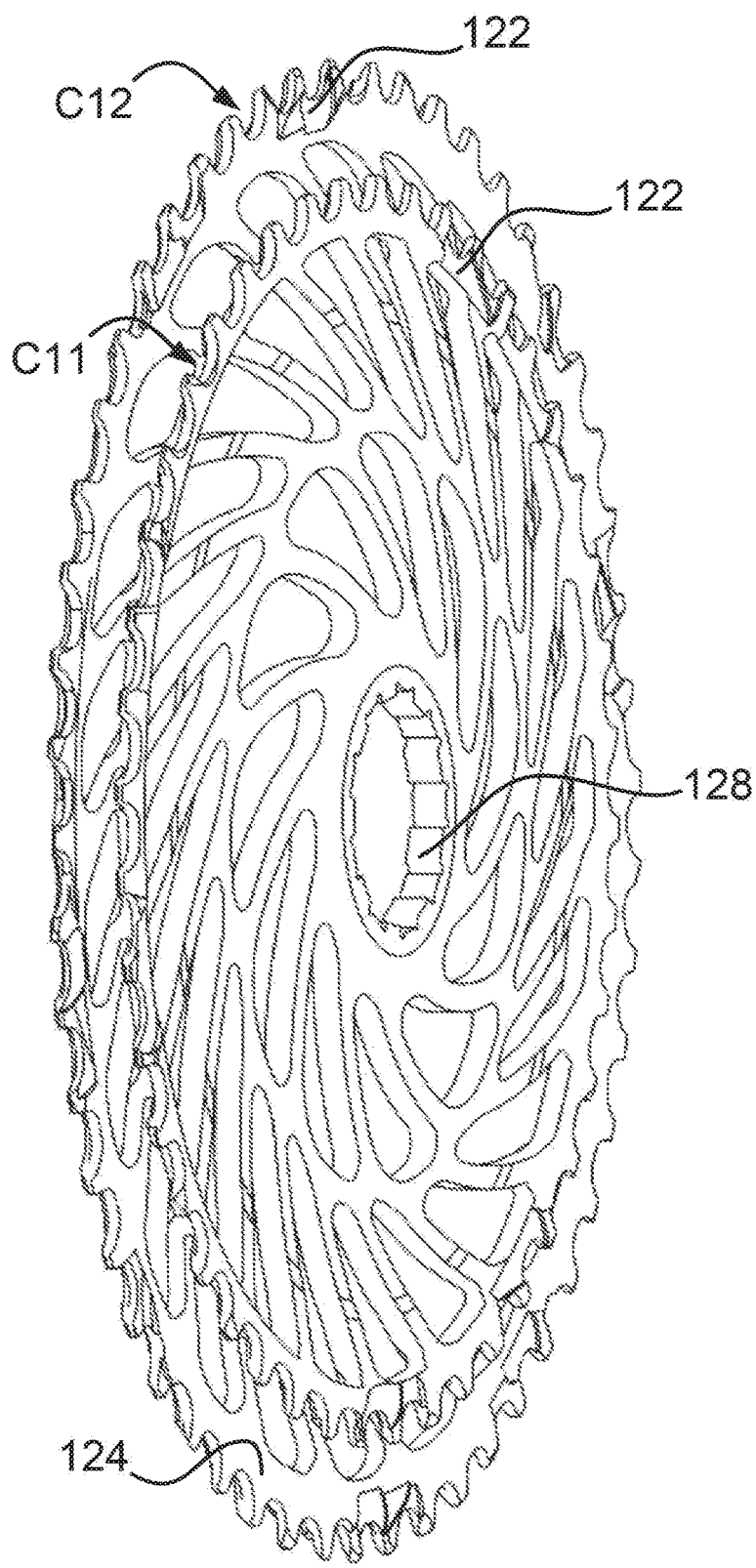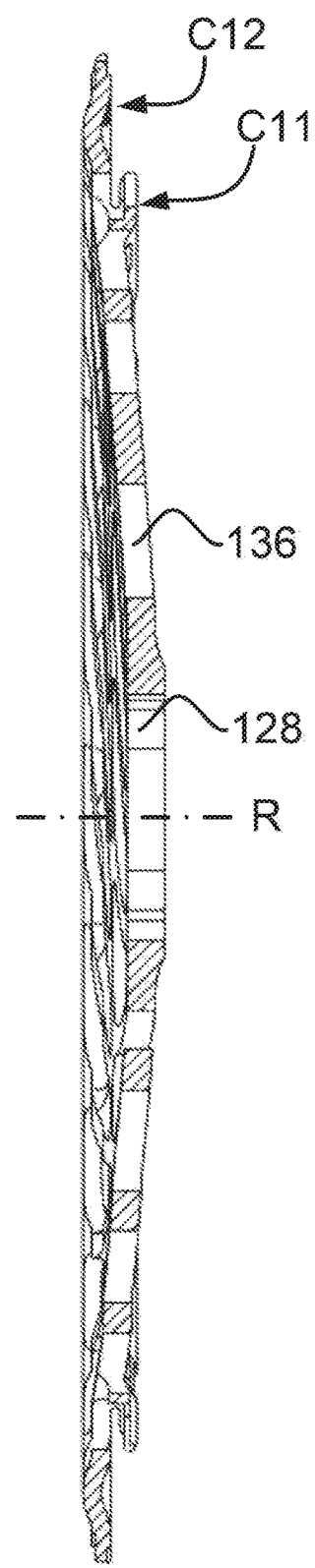
FIG. 13A
FIG. 13B

DRIVE ARRANGEMENT FOR A BICYCLE

BACKGROUND OF THE INVENTION

A bicycle may be equipped with a drive arrangement, such as a chain drive assembly. Drive arrangements may be used to transmit torque from a rider to a rear wheel to propel the bicycle forward. For example, a drive arrangement may transmit torque from a front sprocket assembly, through a chain, and to a rear sprocket assembly to drive a rear wheel. A drive arrangement may be referred to as a drivetrain.

Sprocket assemblies for bicycles may contain one or more individual sprockets. Front sprockets are commonly referred to as chainrings. Chainrings may be attached with various attachment devices. For example, a chainring may be attached with chainring bolts or may be mounted directly to a crank of a bicycle. A plurality of rear sprockets may be referred to as a cassette. A cassette is configured to attach to a freewheeling component of a rear wheel. For example, a cassette may attach to a freehub body of a rear wheel using a keyed and/or threaded connection.

Alignment of a front sprocket assembly with a rear sprocket assembly affects the performance of the chain. For example, a front sprocket assembly having a single chainring may have a single rear sprocket of a cassette in substantial alignment with the single chainring. When the chain connected the single chainring to this substantially aligned single rear sprocket, the chain is under little or no lateral load. However, when the chain is moved laterally to another of the sprockets of the cassette, for instance by movement of a rear gear changer of the drive assembly, the chain experiences some lateral loading.

Chain misalignment from front sprockets to rear sprockets may be referred to as chain skew or cross-chaining. Chain skew increases as the radial distance between the front sprocket axis and the rear sprocket axis decreases and as the axial distance between the engaged front sprocket and the engaged rear sprocket increases. A bicycle having a wide range of sprockets on the rear wheel and a single front sprocket is particularly defined by high levels of chain skew. A drive arrangement having multiple front sprockets arranged ascending in size moving outboard and multiple rear sprockets descending in size moving outboard may be shifted by an experienced user to avoid situations of maximum chain skew while still using the highest and lowest effective gear ratios. In contrast, use of the full range of gear ratios in a drive arrangement having a single front sprocket and multiple rear sprockets requires maximum chain skew of the system.

The chain may be configured to laterally flex sufficiently to engage with rear sprockets of variable axial offsets relative to a front sprocket assembly. For example, the chain may flex to engage with twelve (12) or more rear sprockets while maintaining engagement with a single front sprocket. The chain may also be configured to resist lateral flex to facilitate shifting sprockets. For example, a rear gear changer, which may also be known as a derailleur may move a non-tensioned portion of the chain between the chainring and the cassette laterally. Lateral movement of this portion of the chain may in turn result in lateral movement of the chain engaged with the cassette to engage a different rear sprocket.

Various features of the drive arrangement may be employed to maintain chain engagement. For example, teeth of the sprockets may be configured to limit play of the chain when it is engaged thereon. Because chains often comprise alternating and overlapping inner and outer link plates, teeth may be configured to engage alternatingly thin and thick spaces formed between these plates. For example, a chainring may comprise an even number of alternating thick and thin teeth disposed about its circumference.

Shifting between sprockets of a rear sprocket assembly may be facilitated with various shifting features. For example, shift ramps on an outboard side of a sprocket may facilitate an inboard shift from a relatively outboard sprocket to the sprocket having shift ramps. Teeth on the rear sprockets may be configured to control the chain in a specific orientation to facilitate operation of certain shifting features. For example, a rear sprocket may comprise alternating thick teeth, each of which is wider in an axial dimension than a gap between two inner link plates. In such a way, the chain may only engage this rear sprocket in one configuration with regard to whether inner or outer link plates encompass a given tooth. Therefore, shifting features, such as a shift ramp on an adjacent inboard sprocket, may be optimized for interaction with either inner or outer plates of the chain.

Coaxial alignment features may be employed on the drive arrangement. For example, a single component may be used as a reference for alignment of various other components of the arrangement. For example, both a rear derailleur and a cassette may be coaxially aligned with an axle. Alignment from a drivetrain component, such as this axle, may reduce inaccuracies across various applications due to at least one of wheel or frame tolerance variations. Coaxial alignment of the rear derailleur with the cassette may also facilitate a consistent radial distance between portions of the rear derailleur and the cassette across various rotations of the rear derailleur.

Various components of the drive arrangement may be configured to engage with each other for alignment purposes. For example, a hub mounting device may engage a hub axle and a rear derailleur. A hub body rotates about the hub axle and a freehub body engages the hub body. The freehub body may be configured to rotate relative to the hub body. For example, the freehub body may rotate relative to the hub body in one circumferential direction and remain fixed to the hub body in an opposite circumferential direction to facilitate coasting and power transmission, respectively. A cassette may ride on the freehub body. Thus the cassette and the rear derailleur may share a common alignment reference. Controlling this common alignment reference may facilitate more precise alignment of other components. For example, chain alignment on the rear sprockets by the rear derailleur may be more precise.

The drive arrangement may also be configured for stiffness to aid in precision and/or alignment. For example, a mounting unit may be configured to increase stiffness of the rear derailleur relative to the rear sprocket assembly. Increased stiffness between components may increase the precision of alignment of the chain on the rear sprocket assembly by the rear derailleur.

A relatively stiffer rear derailleur may benefit from a more protected configuration. For example, a rear derailleur, being exposed during a crash or impact of the bicycle on its drive side, may be mounted with an intentionally weak mount, which may be referred to as a derailleur hanger. The intentionally weak derailleur hanger serves to protect the frame of the bicycle and the rear derailleur in the event of such a crash or impact by deflecting first. A rear derailleur configured for greater stiffness may omit an intentionally weak mount. In this configuration, it may be beneficial to locate the rear derailleur at a relatively inboard position so as to protect the rear derailleur and frame in the event of an impact.

SUMMARY

One aspect of the invention provides a drive arrangement for a bicycle comprising a crank arm having a crank mounting portion; a single front drive sprocket having a front chain engaging portion and a front sprocket mounting portion attached to the crank mounting portion; an axle assembly having an axle body configured to attach with an axle end portion; a plurality of rear sprockets located about an axis of the axle body; a chain configured to engage with the front chain engaging portion of the front sprocket and the plurality of rear sprockets, the chain comprising a plurality of inner links alternatingly arranged with a plurality of outer links, wherein each of the plurality of outer links includes an outside flat portion; a gear changer having a gear changer mounting unit located about the axis of the axle and having an inboard portion mounted axially inboard of a frame of the bicycle and an outboard portion mounted axially outboard of the frame of the bicycle, the gear changer configured to move the chain between an axially innermost rear sprocket and an axially outermost rear sprocket of the plurality of rear sprockets; and a control unit configured to control movement of the gear changer. The crank mounting portion is axially aligned closer to the axially outermost rear sprocket than to the axially innermost rear sprocket; the front chain engaging portion is axially aligned inboard of the crank mounting portion; the front sprocket comprises a plurality of thick, tall front teeth; the plurality of outer links are configured to interact with the plurality of thick, tall front teeth and the plurality of inner links are configured to interact with a plurality of thin front teeth interposed between the plurality of thick, tall front teeth; a majority of the plurality of rear sprockets comprise a plurality of thick rear teeth configured to interact with the plurality of outer links of the chain and a plurality of thin rear teeth configured to interact with the plurality of inner links of the chain; the inboard portion of the gear changer mounting unit is shaped and sized to contact the axle assembly such that the inboard portion is axially engaged with an outboard portion of the axle assembly; the inboard portion and the outboard portion of the gear changer mounting unit are shaped and sized to accept the axle assembly to resist axial force imparted to the gear changer; and the control unit is configured to control the gear changer to move by a shift increment.

BRIEF DESCRIPTION OF THE DRAWINGS

FIG. 13A is an isometric view of a subcomponent of the component of FIG. 8;

FIG. 13B is a sectional view of the subcomponent of FIG. 13A taken along 12A-12A;

Other aspects and advantages of the embodiments disclosed herein will become apparent upon consideration of the following detailed description, wherein similar or identical structures have similar or identical reference numerals.

DETAILED DESCRIPTION

A drive arrangement configured to provide a wide range of precise and reliable selection of gears is advantageous to the operation of a bicycle. A drive arrangement that is lightweight, robust, accurate, and simple may improve bicycle performance and reduce the need for service. A drive arrangement for a bicycle may be configured to address these needs.

Figure 1:
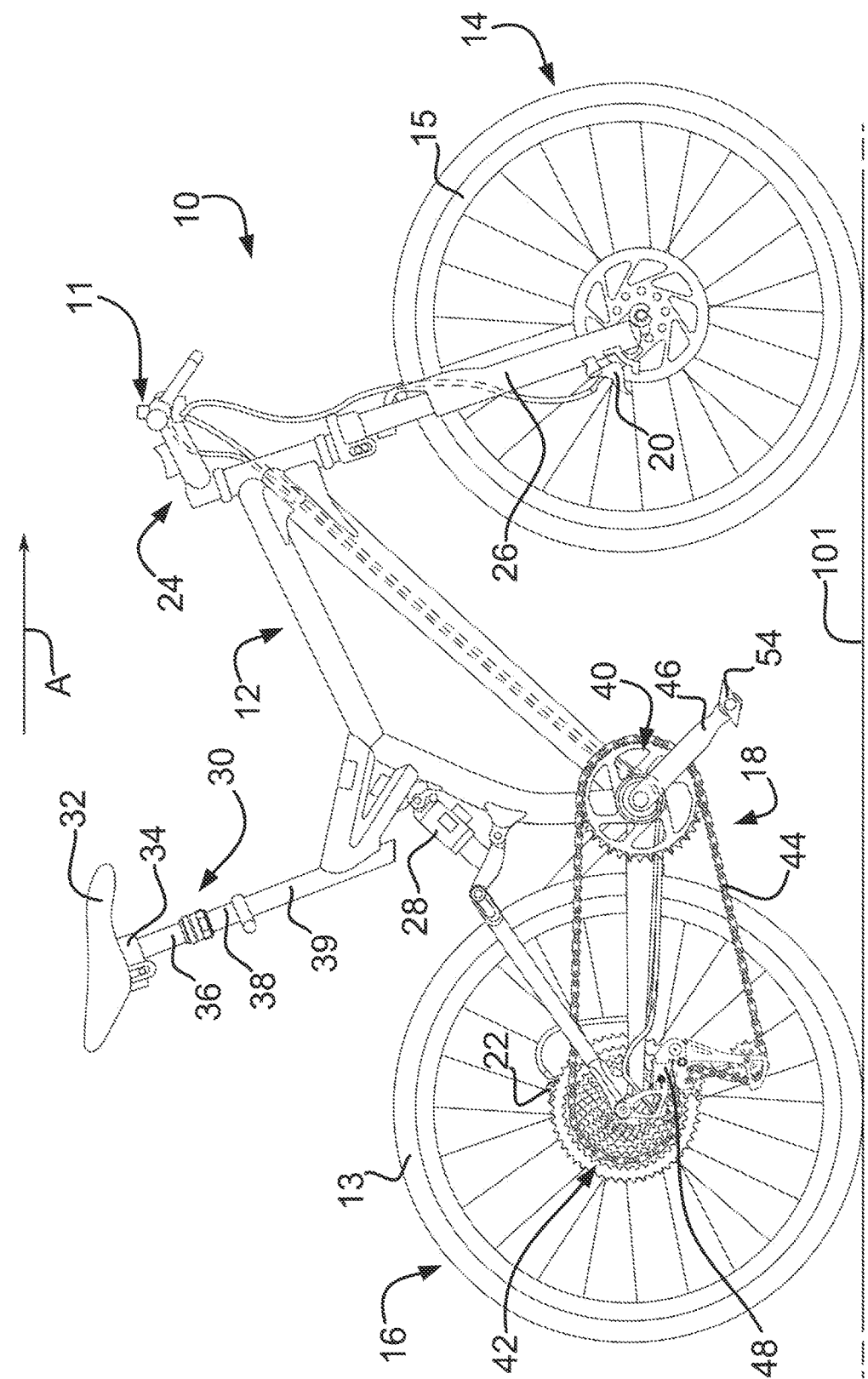
FIG. 1 is a side view of a mountain type bicycle implementing a drive arrangement.

FIG. 1 generally illustrates a bicycle 10 of an off-road or mountain-type configuration including a drive arrangement 18. The bicycle 10 includes a frame 12 and front and rear wheels 14, 16 rotatably attached to the frame 12. A front brake 20 is provided for braking the front wheel 14 and a rear brake 22 is provided for braking the rear wheel 16. Each of the front and rear wheels 14, 16 includes a tire 13 attached to a rim 15, where the tire 13 is configured to engage the riding surface 101. A handlebar assembly 24 is provided for steering the front wheel 14. The direction of arrow "A" indicates a front and/or forward orientation of the bicycle 10. As such, a forward direction of movement of the bicycle 10 corresponds to the direction A.

Other configurations of the bicycle 10 are contemplated. For example, the bicycle 10 may have a road-type configuration. Potential differences between bicycles of various configurations include those between mountain and road-type bicycles. For example, FIG. 1 depicts the handlebar assembly 24 in a flat-type configuration, whereas a road-type example may have a drop-type configuration of the handlebar assembly 24. A road-type configuration may also include various other features, such as aerodynamic features.

FIG. 1 depicts features often found on off-road or mountain-type bicycles. For example, the front wheel 14 is attached to the frame 12 through a front suspension 26. The front suspension 26 may be of a suspension fork configuration as shown. The rear wheel 16 may be attached to the frame 12 through a rear suspension 28. The rear suspension 28 may include a combination of springs, dampers, and/or linkages to achieve desired control of the rear wheel 16. The bicycle 10 may also include an adjustable seating component 30 to facilitate rapid adjustment of seating position. The adjustable seating component 30 may include a saddle 32 attached to a seat post upper 36 through a seat post head 34. The seat post upper 36 is configured to move relative to a seat post lower 38, which is fixed to a seat tube 39 of the frame 12.

The adjustable seating component 30 may be operable by a rider during riding of the bicycle 10. For example, the adjustable seating component 30 may be operable through use of a control assembly 11. Such operation may be through mechanical connection, such as a Bowden cable system, hydraulic communication, or electronic communication. The control assembly 11 or other devices for controlling the adjustable seating component 30 may be integrated with various other controls of the bicycle 10. For example, the control assembly 11 may be configured to operate the adjustable seating component 30 and a component of the drive arrangement 18.

Figure 2:
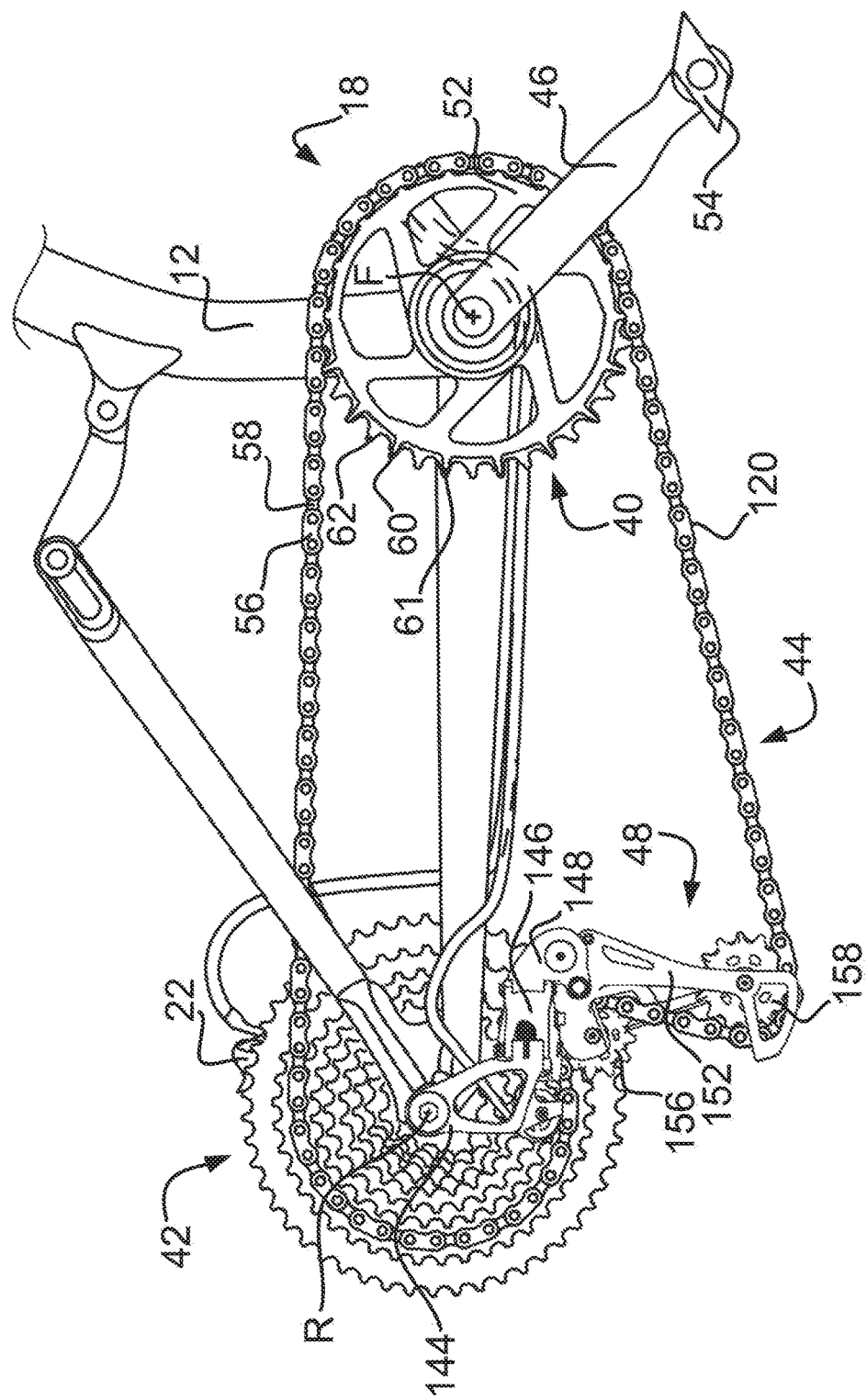
FIG. 2 is an enlarged view of the drive arrangement of FIG. 1.

In FIGS. 1 and 2, the drive arrangement 18 is depicted including a front sprocket assembly 40 rotatably mounted to the frame 12, a rear sprocket assembly 42 mounted to the rear wheel 16, and a chain 44 engaging the front sprocket assembly 40 and the rear sprocket assembly 44. The front sprocket assembly 40 is configured to rotate about a front axis F. The front sprocket assembly 40 may be attached to a crank arm 46 to facilitate torque transfer from a rider to the rear wheel 16 through the front sprocket assembly 40, to the chain 44, and to the rear sprocket assembly 42. The chain 44 may be shifted through a plurality of sprockets of the rear sprocket assembly 42 with a rear gear changer 48. The chain 44 may also be shifted through a plurality of sprockets of the front sprocket assembly 40 with a front gear changer (not shown).

Figure 5A:
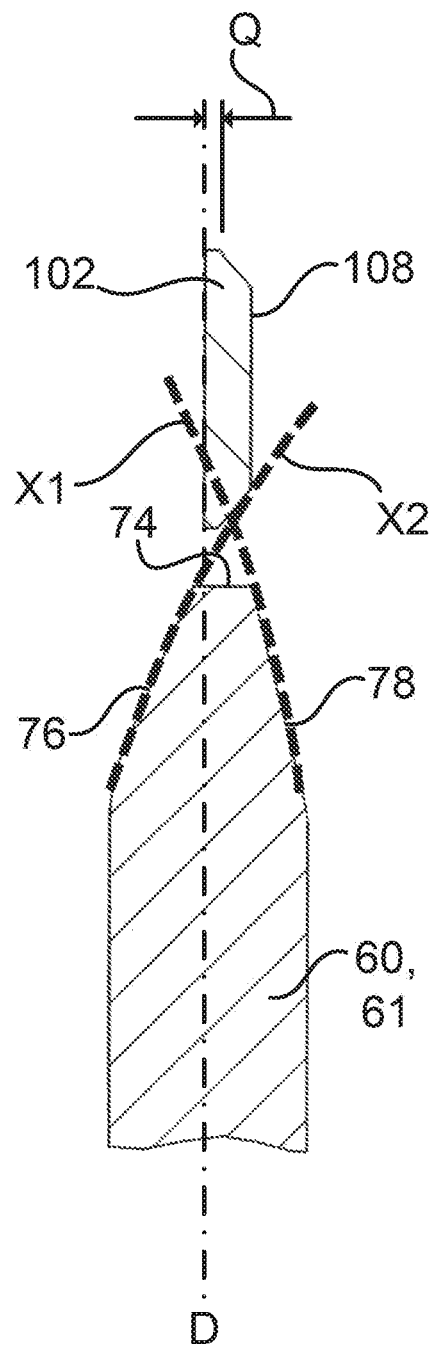
FIG. 5A is a schematic sectional view of the component of the drive arrangement of FIG. 3A.
Figure 5B:
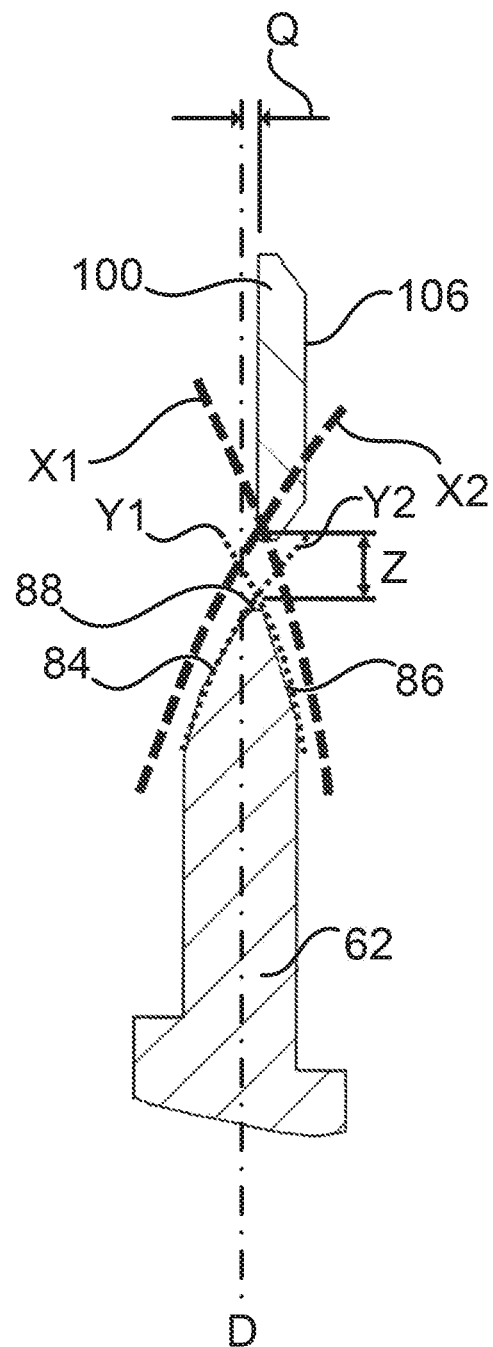
FIG. 5B is a schematic sectional view of the component of the drive arrangement of FIG. 3A.

With reference to FIGS. 5A and 5B, a front central plane D passes through the front sprocket assembly 40 parallel to the direction A. The front central plane D may be defined by placement of the chain 44 relative to the front sprocket assembly 40. For example, the front central plane D may pass through a central point of the chain 44 along the front axis F when engaged. Components may be described as inboard or outboard relative to the front central plane D, depending on whether those components are nearer to or further from, respectively, the frame 12 in an axial distance along the front axis F.

Figure 9:
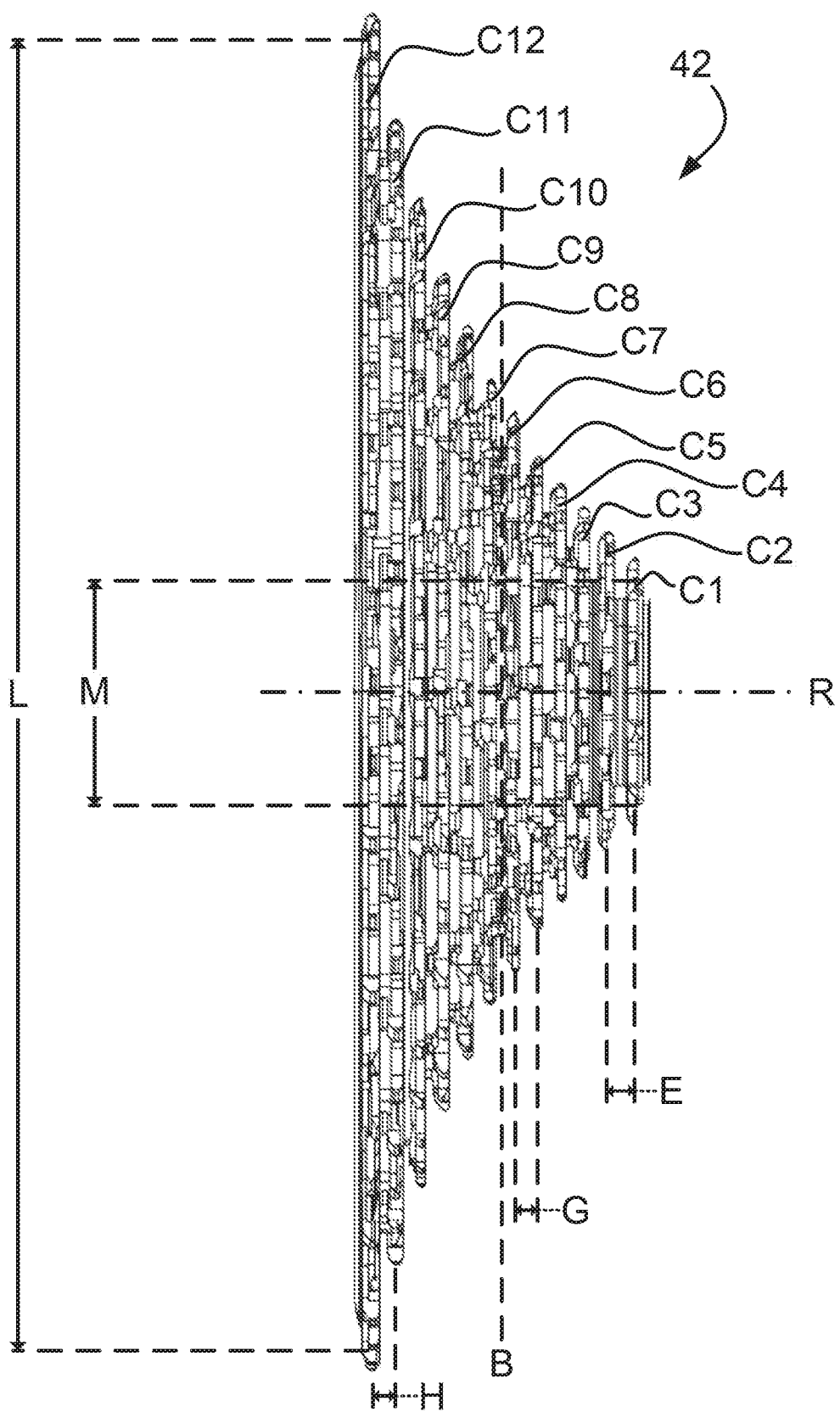
FIG. 9 is an end view of the component of FIG. 8.

Now referring to FIG. 9, a rear central plane B passes through the rear sprocket assembly 42 parallel to the front central plane D. The rear central plane B may be defined by a median point of the rear sprockets C1-C12 of the rear sprocket assembly 42 along the rear axis R. For example, the rear central plane B may pass through a central point of the chain 44 along the rear axis R when engaged with a sixth rear sprocket (not shown) of an evenly-spaced configuration of the rear sprocket assembly 42 having 11 sprockets. Alternatively, the rear central plane B may be a halfway point between a central point of engagement of the chain 44 on the inboardmost sprocket and a central point of engagement of the chain 44 on the outboardmost sprocket. Components may be described as inboard or outboard with reference to the rear central plane B. The rear central plane B may be the same as the front central plane D. Alternatively, the rear central plane B may be inboard or outboard of the front central plane D.

FIG. 2 is an enlarged view of the drive arrangement 18 of FIG. 1. A pedal 54 is shown connected to the crank arm 46 to facilitate power transfer from a rider into the drive arrangement 18. The chain 44 includes pluralities of each of an outer link plate 56 and an inner link plate 58. The drive arrangement 18 may be configured to control the outer and inner link plates 56, 58 of the chain 44 with various features. For example, the chainring 52 may be configured with at least one of a thick chainring tooth 60 and at least one of a thin chainring tooth 62. The thick chainring tooth 60 may be sized and shaped to interact with the outer link plate 56 of the chain 44 and the thin chainring tooth 62 may be sized and shaped to interact with the inner link plate 58 of the chain 44. The thick and thin chainring teeth 60, 62 may be arranged alternatingly about the chainring 52 to interact with alternatingly arranged outer and inner link plates 56, 58 of the chain 44. To facilitate such interaction, the chainring 52 may be configured with an even number of teeth 60, 62, where the number of thick chainring teeth 60 is equal to the number of thin chainring teeth 62.

Other features of the drive arrangement 18 may be configured for interaction with one of the outer link plate 56 and the inner link plate 58 of the chain 44. For example, thick and thin teeth, as described with reference to the chainring 52 above, may be employed on other components. Locating the chain 44 relative to corresponding features of the other components of the drive arrangement 18 may facilitate greater precision. For example, alignment features such as thick and thin teeth maintaining a specific orientation of the chain with regard to outer and inner link plates 56, 58 may facilitate shifting features configured specifically for interaction with one of the inner or outer link plates 56, 58. Features configured for specific interaction may maintain more precise control of the chain 44 than features configured for interaction with both of the inner and outer link plates 56, 58.

Figure 3A:
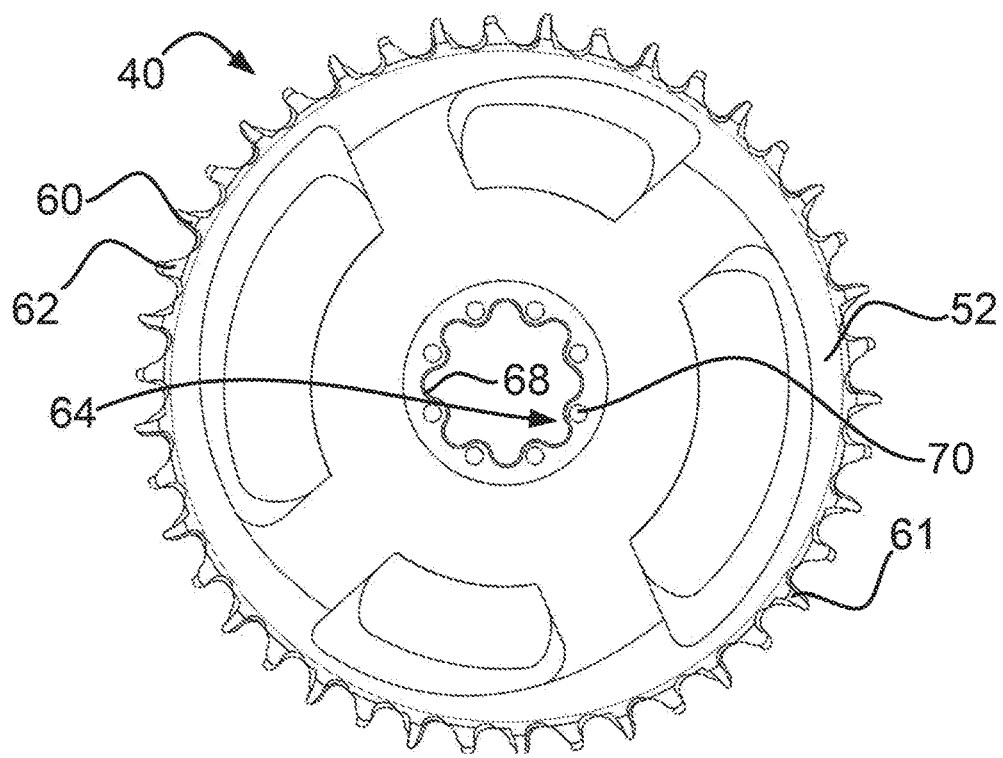
FIG. 3A is a side view of a component of the drive arrangement of FIG. 2.
Figure 3B:
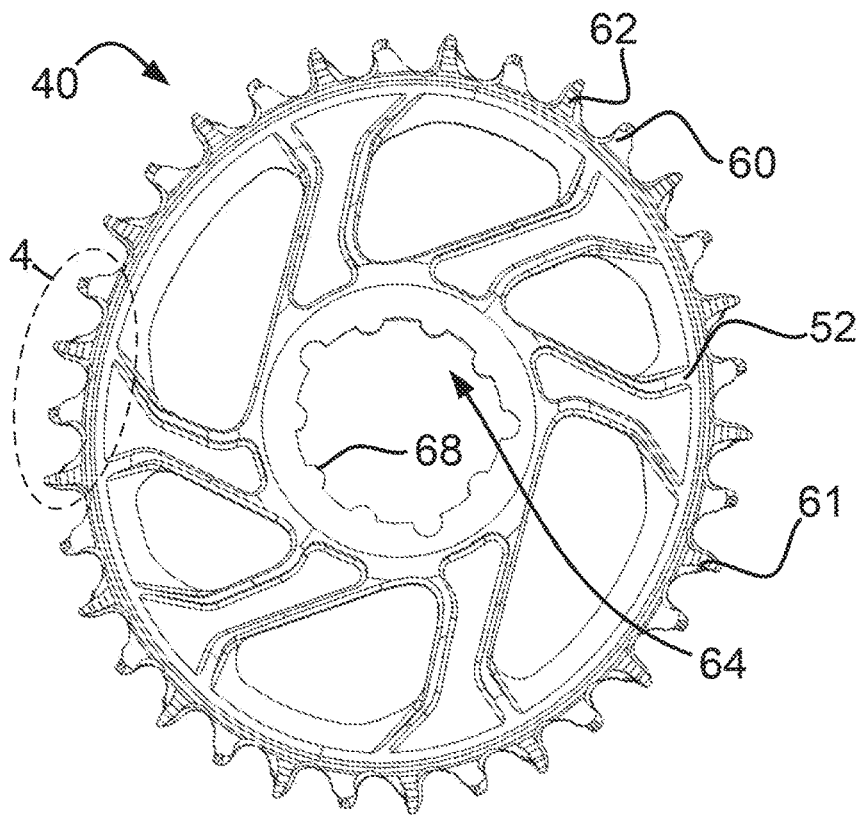
FIG. 3B is an alternative configuration of the component of the drive arrangement of FIG. 3A.

FIGS. 3A and 3B show the front sprocket assembly 40. The front sprocket assembly 40 connects to the crank arm 46 through a front sprocket connection feature 64. The front sprocket connection feature 64 may be a discrete component or may be integrated with another component of the front sprocket assembly 40. For example, the front sprocket connection feature 64 may be part of the chainring 52 as shown in FIGS. 3A and 3B. The front sprocket assembly of FIGS. 3A and 3B includes a front sprocket connection contour 68 configured to resist rotation of the chainring 52 relative to the crank arm 46 about the front axis F. FIG. 3B also illustrates that the front sprocket assembly 40 may be of a non-round configuration.

The front sprocket connection contour 68 may also be configured to resist pivoting off of the front axis F. Pivoting at the front sprocket connection feature 64 may lead to derailment of the chain 44 as the chainring 52 moves laterally away from a chainline of the drive arrangement 18. The front sprocket connection contour 68 may include one or more features to increase stiffness of the drive arrangement 18. In an embodiment, the front sprocket connection contour 68 interacts with a corresponding feature of the crank arm 46 over a distance along the front axis F to resist pivoting and rotation.

The front sprocket connection feature 64 may include a front sprocket fixing feature 70. For example, the front sprocket connection feature 64 may include a threaded connection between the crank arm 46 and the front sprocket assembly 40. In an embodiment, the front sprocket fixing feature 70 comprises a plurality of through holes. The front sprocket fixing feature 70 may be configured to locate a front fixing member 72. The front fixing member 72 may be a plurality of front fixing members. For example, the plurality of front fixing members 72 may be configured to pass through the front sprocket fixing feature 70 to axially secure the front sprocket assembly 40 to the crank arm 46.

The chainring 52 may be configured to mount directly to the crank arm 46. For example, the front sprocket connection feature 64 may be integrated with the chainring 52. Reducing the number of removable connections between components of the front sprocket assembly 40 and the crank arm 46 may be useful to reduce flexing or pivoting, weight, and/or cost.

The chainring 52 may be axially offset from the front sprocket connection feature 64. For example, the chainring 52 may be offset axially closer to the frame 12. This offset may facilitate locating the chainring 52 within an axial range between the sprockets of the rear sprocket assembly 42. In an embodiment, the chainring 52 is offset inboard along the front axis F to be axially between an axial range of the rear sprocket assembly 42. The chainring 52 may be positioned axially closer to a smallest cog (C1) of the rear sprocket assembly 42 than to a largest cog (C12) of the rear sprocket assembly 42. This axial offset may facilitate a reduction in lateral force on the smallest cog C1 when engaged with the chain 44 in a driving mode, as the front sprocket assembly 40 is imparting force on the rear sprocket assembly 42 through the chain 44.

The chainring 52 may comprise teeth of various configurations. For example, the chainring 52 may comprise the plurality of thick chainring teeth 60 arranged alternatingly and adjacently between the plurality of thin chainring teeth 62. The alternating arrangement of the thick chainring teeth 60 and the thin chainring teeth 62 may guide the corresponding gaps between the outer link plates 56 and the inner link plates 58 of the chain 44. A close fit between the thick chainring tooth 60 and the outer link plates 56 may be achieved. A close fit may also be achieved between the thin chainring tooth 62 and the inner link plates 58.

The chainring 52 may also comprise one or more of a tall chainring tooth 61. The tall chainring tooth 61 may be the same as another type of tooth. For example, the tall chainring tooth 61 and the thick chainring tooth 60 may be the same. The tall chainring tooth 61 is taller, extending radially further from the front axis F, than the non-tall teeth. In an embodiment, each of the thick chainring teeth 60 is also the tall chainring tooth 61.

As the chainring 52 rotates about the front axis F, the thick chainring tooth 60 may move from an unengaged position with the chain 44 to an engaged position. If a width of the thick chainring tooth 60 is close to a width between the outer link plates 56, then guiding features may improve reliability of engagement of the chain 44 with the thick chainring tooth 60. For example, an axially narrow configuration of a thick tooth tip 74 of the thick chainring tooth 60 may create a ramped configuration of the thick chainring tooth 60 to improve engagement of the chain 44. Such a ramped configuration may impart significant lateral loads on the thick chainring tooth 60 during the engagement process. The greater radial dimension of the thick chainring tooth 60 that is also the tall chainring tooth 61 may provide a less ramped configuration, decreasing lateral loads as the chain 44 engages.

The axially narrow configuration of the thick tooth tip 74 may be axially angled and/or offset for guiding the chain 44 onto the chainring 52. For example, the thick chainring tooth 60 may comprise a ramped configuration of an outboard thick tooth face 76 and a less ramped or non-ramped configuration of an inboard thick tooth face 78. This configuration may facilitate arrangement of the front central plane D axially outboard relative to the rear central plane B of the rear sprocket assembly 42. For example, the outboard ramped configuration of the chainring 52 facilitates guiding the chain 44 when the chain 44 is skewed inboard.

Figure 4:
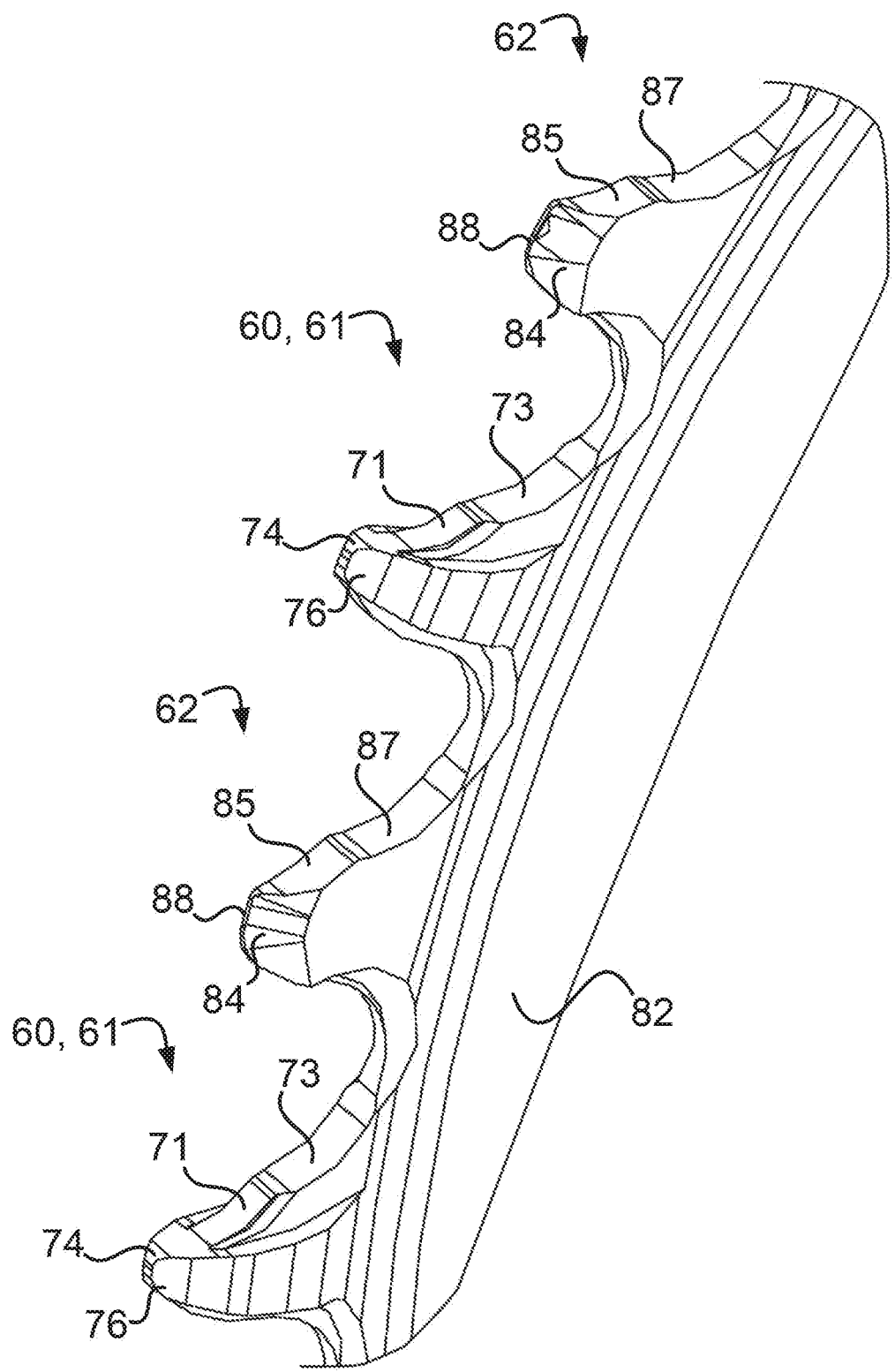
FIG. 4 is an enlarged isometric view of the component of the drive arrangement of FIG. 3B.

FIG. 4 depicts an isometric view of the front sprocket assembly 40, specifically the chainring 52. The chainring 52 is depicted with an inboard chainring side 80 and an outboard chainring side 82. As shown in FIGS. 5A and 5B, a centerline of the thick tooth tip 74 is axially inboard of the front central plane D by an offset Q. The offset Q may facilitate a better compromise of engagement with each sprocket of the rear sprocket assembly 42. For example, the chain 44 engaging the front sprocket assembly 40 from the inboard chainring side 80 may more easily engage with the thick tooth tip 74 because of the offset Q to the inboard side.

An axially asymmetrical configuration of the thick chainring tooth 60 may also facilitate reliable engagement of the chain 44. For example, the outboard thick tooth face 76 may have a ramped configuration to gradually guide the chain 44 onto the thick chainring tooth 60.

The ramped configuration of the outboard thick tooth face 76 may be tuned to optimize engagement and wear characteristics of the drive arrangement 18. For example, the outboard thick tooth face 76 may be closer to parallel with the front central plane D to minimize sliding of the chain 44 on the outboard thick tooth face 76 and thus wear. Alternatively, the outboard thick tooth face 76 may diverge further from parallel with the front central plane D to facilitate engagement from a greater angle of chain skew. This engagement is facilitated as the outboard thick tooth face 76 diverges further from parallel because the thick tooth tip 74 is moved inboard as a result. Thus, decreasing the width of the thick tooth tip 74 by increasing the angle from parallel of the outboard thick tooth face 76 will facilitate better engagement of the chain 44 from the inboard chainring side 80 while potentially increasing wear of the drive arrangement 18.

The axial width of the thick tooth tip 74 may be decreased without increasing the angle of divergence from parallel of the outboard thick tooth face 76 from the front central plane D by increasing the height of the thick chainring tooth 60. This case may be described as the thick chainring tooth 60 also being the tall chainring tooth 61. The height of the tall chainring tooth 61 may be constrained by certain variables. For example, the tall chainring tooth 61 may be vulnerable to damage if it protrudes past the chain 44 during engagement. In off-road use, the chainring 52 is vulnerable to ground strike, such as through a rock or a log. If the chain 44 does not cover the thick tooth tip 74, then the thick tooth tip 74 may deform upon impact. Deformation of the thick tooth tip 74 may result in an axially wider, damaged configuration of the thick tooth tip 74. Such a damaged configuration of the thick tooth tip 74 may not engage with or disengage from the chain 44 as intended and could result in failure of the drive arrangement 18.

The thin chainring tooth 62 may be configured similarly to the thick chainring tooth 60 and/or the tall chainring tooth 61. For example, the thin chainring tooth 62 may be axially displaced from the front central plane D by the offset Q. The thin chainring tooth 62 may also have a ramped configuration of an outboard thin tooth face 84 and a less ramped or non-ramped configuration of an inboard thin tooth face 86. The thin chainring tooth 62 may also have an axially narrow configuration of a thin tooth tip 88 to facilitate engagement of the chain 44 during a chain skew scenario. Because the thin chainring tooth 62 is relatively narrow in comparison to the thick chainring tooth 60, less tooth height is necessary to achieve a similar narrow configuration. For example, the thin chainring tooth 62 may be of the same height as the thick chainring tooth 60, while having a less-angled configuration outboard thin tooth face 84 relative to the outboard thick tooth face 78 in a radial direction and the same axial width of the thin tooth tip 88 relative to the to the thick tooth tip 74. Alternatively, the outboard thin tooth face 86 may have a similarly-angled configuration to the outboard thick tooth face 76, the thin tooth tip 88 may have an axially narrower configuration relative to the thick tooth tip 74, and the thin chainring tooth 62 may be radially shorter than the thick chainring tooth 60.

FIG. 4 also depicts a first load flank 87 on the thick, tall chainring tooth 60, 61 and a second load flank 73 on the thin chainring tooth 62. The first and second load flanks 87, 73 are configured to transmit force between the front sprocket assembly 40 and the chain 44. For example, the first and second load flanks 87, 73 may transmit force from the rider to a chain roller 110 of the chain 44. The force transmission may involve sliding friction and may impart wear on the first and second load flanks 87, 73. Wear on the teeth 60, 61, 62 may negatively impact function of the drive arrangement. For example, wear on the first and second load flanks 87, 73 may create a recessed configuration in the area of the load flanks 87, 73 that tends to resist disengagement of the chain 44. This resistance may further lead to a phenomenon known as chain suck.

The drive arrangement 18 may be configured to delay negative effects of wear, thus potentially increasing the durability and useful life for the drive arrangement 18. For example, the first and second load flanks 87, 73 may protrude relative to other surfaces of the teeth 60, 61, 62. FIG. 4 depicts a first flank recess 85 disposed radially outwardly of the first load flank 87 and a second flank recess 71 disposed radially outwardly of the second load flank 73. Each of the first and second flank recesses 71, 85 is configured to be recessed relative to the respective one of the first and second load flanks 87, 73. In a non-worn condition of the front sprocket assembly 40, the load flanks 87, 73 transmit force to the chain roller 110 and some wear results. In a partially worn condition, the load flanks 87, 73 are not recessed relative to the first and second flank recesses 85, 71 and the chain 44 is not impeded from proper disengagement. In this configuration, the useful lifetime of the drive arrangement 18 is extended to a point where the first and second load flanks 87, 73 have been worn to a point where each is recessed relative to the respective one of the first and second flank recesses 85, 71.

In the drive arrangement 18, the tooth thickness is selected for purposes of engaging with the chain roller 110. That is, as the chain 44 meshes with the chainring 52, the load flank 87, 73 of each tooth sequentially contacts the next chain roller 110 and applies drive pressure as the rider pedals, pulling the chain 44 around the chainring 52. It is thus critical that the load flank 87, 73 contact the chain roller 110 only, and not protrude laterally beyond the rollers, because the rollers are the only component of the chain 44 designed to accept the drive force of the chainring 52. When forming specially designed thick teeth 60 intended to fit within the outer link gaps K, the tooth load flank 87, 73 must continue to contact the chain 44 only at the chain rollers 110.

FIGS. 5A and 5B show schematically tooth height and geometry. FIG. 5A depicts the tall, thick chainring tooth 60, 61. The dashed lines in FIG. 5A represent a first path X1 traveled by an inboard configuration of an outer plate inner face 108 of the chain 44 and a second path X2 traveled by an outboard configuration of the outer plate inner face 108 of the chain 44 during engagement with the front sprocket assembly 40 during extremes of chain skew in the drive arrangement 18. The first and second paths X1, X2 represent maximum tooth dimensions so as to not interfere with engagement of the chain 44. The intersecting point of the first and second paths X1, X2 represents the highest possible point of the thick tooth tip 74 to ensure reliable engagement of the tooth 60, 61 with the chain 44 in the event of extreme chain skew. The geometry of the thick tooth tip 74, the outboard thick tooth face 76, and the inboard thick tooth face 78 are formed in accordance with the first and second paths X1, X2.

FIG. 5B depicts a similar situation for the thin chainring tooth 62. The smaller dashed lines in FIG. 5B represent a third path Y1 traveled by an inboard configuration of an inner plate inner face 106 of the chain 44 and a fourth path Y2 traveled by an outboard configuration of the inner plate inner face 106 of the chain 44 during engagement with the front sprocket assembly 40 during extremes of chain skew in the drive arrangement 18. The third and fourth paths Y1, Y2 intersect to represent the highest possible point of the thin tooth tip 88 to ensure reliable engagement of the tooth 62 with the chain 44 in the event of extreme chain skew. A height difference Z represents the difference in height between maximally-sized configurations of the tall chainring tooth 61 and the thin chainring tooth 62.

Figure 6:
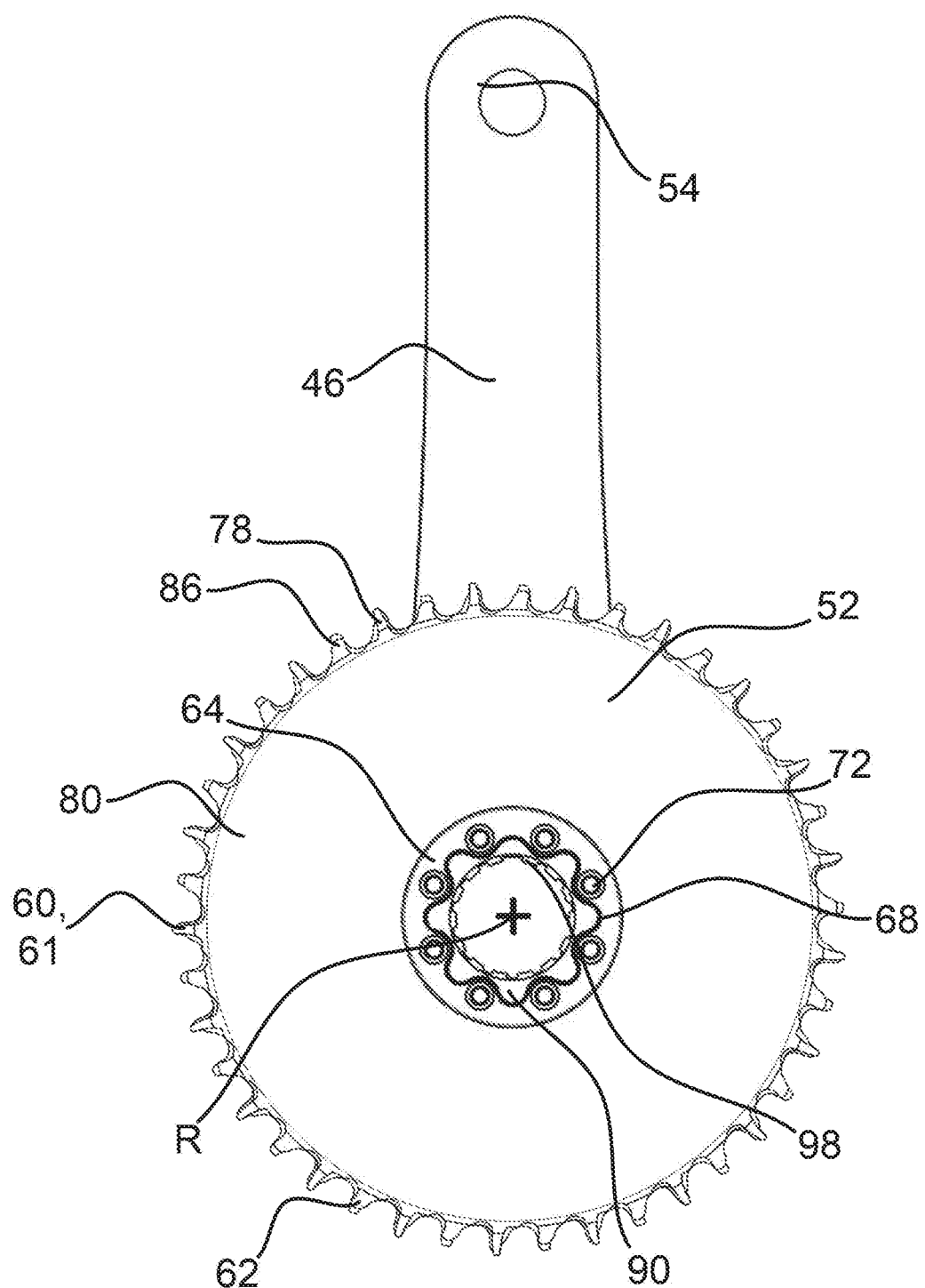
FIG. 6 is a side view of a component of the drive arrangement of FIG. 2.

FIG. 6 depicts the crank arm 46 and front sprocket assembly 40 from the inboard direction. The crank arm 46 includes a pedal mount 47 for engaging the pedal 54. The crank arm 46 may mount to the front sprocket assembly 40 in various ways. For example, the chainring 52 may be configured to mount directly to the crank arm 46, as in FIGS. 3A and 3B.

The crank arm 46 may include a crank axle (not shown). Alternatively, the crank axle (not shown) may be separate or included on an opposing arm (not shown) opposite the crank arm 46. In an embodiment, the crank arm 46 is configured to engage the crank axle (not shown) through an axle engagement feature 98. The axle engagement feature 98 may be of an anti-rotation configuration. For example, the axle engagement feature 98 may have a splined configuration.

The axle engagement feature 98 and the interaction of an arm connection contour 90 of the crank arm 46 and the front sprocket connection contour 68 contribute to maintaining alignment of the front sprocket assembly 40 of the drive arrangement 18. A relatively inflexible configuration, which may include the fixing member 72 as a contributing component to rigidity, will decrease deflection of the chainring 52 during torque input from the rider through the pedal 54. Less deflection of the chainring 52 facilitates engagement of the chain 44 and the chainring 52 across a wider range of chain skew to the rear sprocket assembly 42. For example, the chainring 52 may be configured with an axially wider configuration of the thick tooth tip 74 than would be possible with a less rigid arrangement while maintaining engagement of the chain 44. All else being equal, an axially wider configuration of the thick tooth tip 74 facilitates the outboard thick tooth face 76 to be sized and shaped to diverge less from the front central plane D and thus reduce wear of the chainring 52 and/or the chain 44.

Figure 7A:
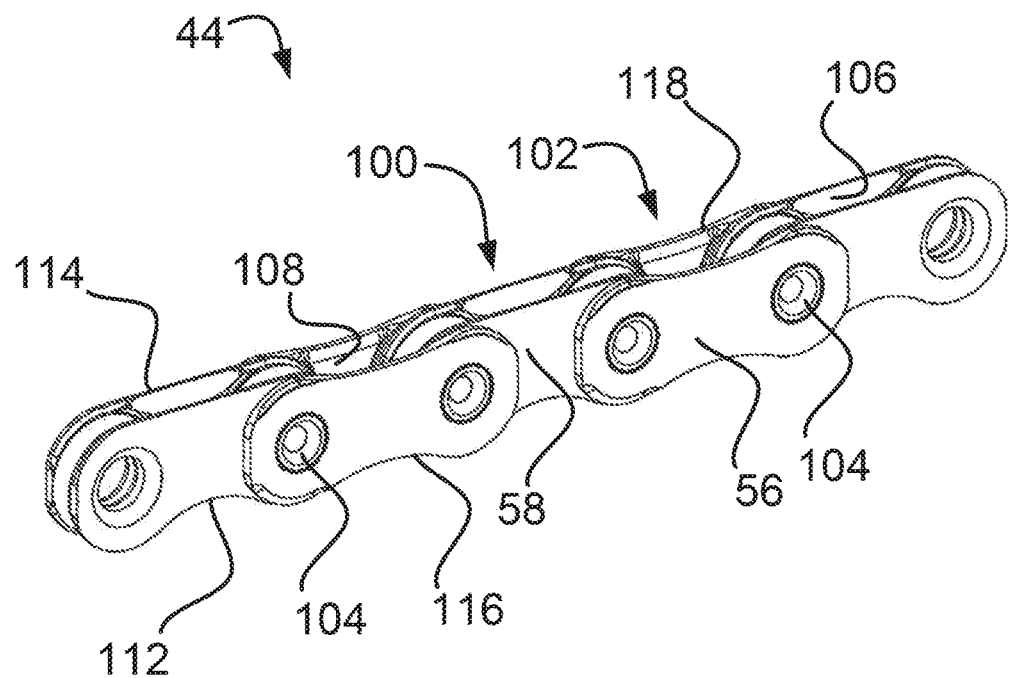
FIG. 7A is an isometric view of a component of the drive arrangement of FIG. 2.
Figure 7B:
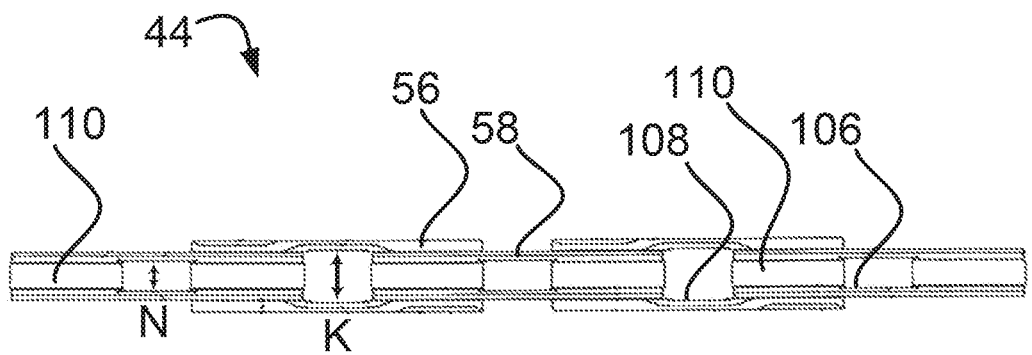
FIG. 7B is a side view of the component of FIG. 7A.

FIG. 7A is an isometric view of the chain 44. The chain 44 may be described as having an inner link 100 and an outer link 102. A plurality of the inner links 100 and the outer links 102 may be linked alternatingly to form a continuous loop of the chain 44. The inner link 100 includes a pair of the inner link plates 58. The outer link 102 includes a pair of the outer link plates 56. The outer link 102 and the inner link 100 may are joined with a chain pin 104. The chain pin 104 passes through one of the pair of the outer link plates 56, both of the inner link plates 58, then through the other of the pair of the outer link plates 56. The chain pin 104 may be configured to facilitate rotation of the outer link 102 relative to the inner link 100. In an embodiment, the chain pin 104 may have an interference fit with the outer link plates 56 and a clearance fit with the inner link plates 58.

The chain 44 may be configured for close engagement with other components of the drive arrangement 18. For example, the chain 44 may have relatively narrow gaps between respective pairs of the inner link plates 58 and the outer link plates 56. Each of the outer link plates 56 includes the outer plate inner face 108, opposite the outer plate inner face 108 of the opposing one of the outer link plate 56. The distance between opposing pairs of the outer plate inner faces 108 may be defined as an outer link gap K. Each of the inner link plates 58 includes the inner plate inner face 106, opposite the inner plate inner face 106 of the opposing one of the inner link plate 58. The distance between opposing pairs of the inner plate inner faces 106 may be defined as an inner link gap N.

The chain 44 includes the chain roller 110 between pairs of the inner link plates 58 and the outer link plates 56. The chain roller 110 provides a surface for interaction with teeth of the front sprocket assembly 40 and the rear sprocket assembly 42. The chain roller 110 may be tuned in axial width to accommodate a corresponding dimension of teeth, for example the thin chainring tooth 62.

The presence of large sprockets on the front and/or rear sprocket assemblies 40, 42 may significantly increase tension on the chain 44. The chain 44 may be configured with strengthening characteristics. Strengthening of the chain 44 may have increased importance when the dimensions of the chain 44 are relatively narrow to accommodate shifting between a tightly-spaced configuration of the rear sprocket assembly 42.

A shift increment defined between two adjacent ones of the rear sprockets C1-C12 may thus be decreased. A small shift increment allows for greater resolution of input from the control assembly 11. For example, the control assembly 11 may pull a greater amount of cable per shift increment, thus decreasing inaccuracies from imperfect cable and housing systems.

The chain 44 may be configured with a non-beveled configuration to increase strength. For example, the inner link 100 of the chain 44 may have an inside inner beveled portion 112 configured to engage with the front and rear sprocket assemblies 40, 42 and an outside inner flat portion 114 configured to increase strength. The outside inner flat portion 114 may be configured to include additional material for increasing strength near stress concentration points on the chain 44 due to tension.

The outer link 102 of the chain 44 may be similarly configured. For example, as shown in FIG. 2, the outer link 102 of the chain 44 may include an inside outer beveled portion 116 configured to engage with the front and rear sprocket assemblies 40, 42 and an outside outer flat portion 120 configured to increase strength. Referring to FIG. 7A, the outer link 102 may alternatively include an outside outer reduced beveled portion 118. The outside outer reduced beveled portion 118 may be configured to be a compromise between strength and engagement, For example, the outside outer reduced beveled portion 118 may have a relatively slight bevel configured for engaging a portion of the rear gear changer 48 while maintaining more strength than a more beveled configuration as in the inside outer beveled portion 116.

Flat outside portions of the chain 44 may also protect components of the drive arrangement 18. For example, the outside outer flat portion 120 may cover the tall chainring tooth 61 during engagement of the chain 44. As described above in reference to the front sprocket assembly 40, protecting the teeth 60, 61, 62 can preserve function of the drive arrangement by reducing the possibility of deformation of the thin tooth tip 88 and the thick tooth tip 74 from impacts.

The chain 44 may be configured for a specific amount of lateral flex. For example, tolerances between components of the chain 44 may be tuned to permit limited lateral movement about each of the chain pins 104. The amount of lateral flex may be configured to facilitate smooth running of the drive arrangement 18 at high levels of chain skew associated with a widely-spaced configuration of the rear sprocket assembly 42. This configuration provides a minimum amount of flex required from the chain 44 in the drive arrangement 18. The amount of lateral flex may also be configured to facilitate precise location of the chain 44 responsive to movement of the rear gear changer 48. This configuration provides a maximum amount of flex permitted in the chain 44 to facilitate shifting of the drive arrangement 18.

Figure 8:
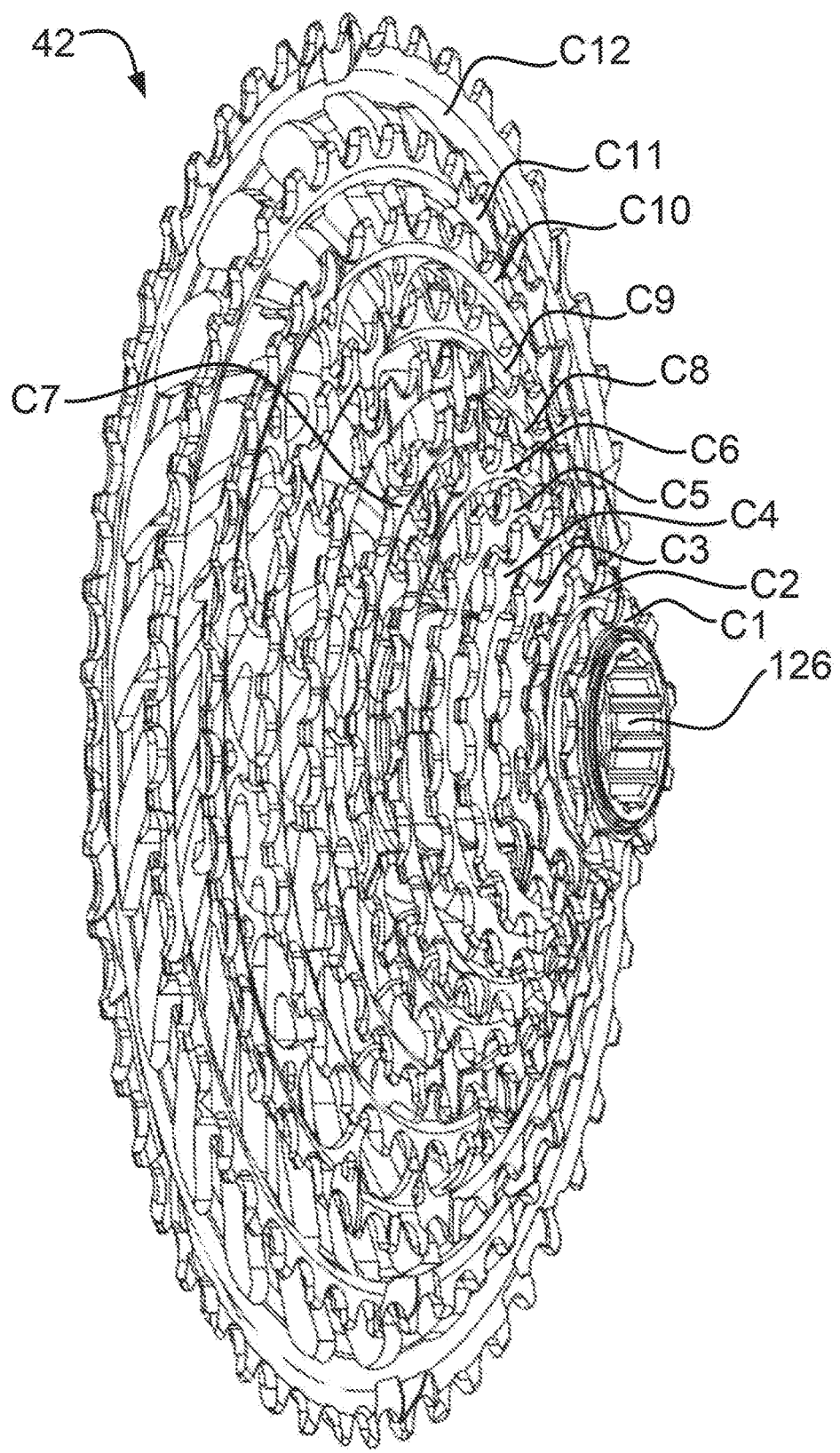
FIG. 8 is an isometric view of a component of the drive arrangement of FIG. 2.

FIG. 8 is an isometric view of the rear sprocket assembly 42. The rear sprocket assembly 42 includes a plurality of rear sprockets C1-C12. The drive arrangement 18 is configured for the number and spacing of the rear sprockets C1-C12. The embodiment shown and described includes a rear sprocket assembly 42 having twelve (12) rear sprockets C1-C12. The rear sprockets C1-C12 may be referred to individually. For example, a first rear sprocket C1 may be the smallest of the rear sprockets C1-C12 and a twelfth rear sprocket C12 may be the largest of the rear sprockets C1-C12.

FIG. 9 shows an end view of the rear sprocket assembly 42. The rear sprocket assembly 42 may have various spacing configurations. For example, there may be variable spacing between adjacent pairs of the rear sprockets C1-C12. In an embodiment, the rear sprocket assembly 42 has at least three (3) distinct spacing distances between adjacent pairs of the rear sprockets C1-C12.

Spacing of the rear sprocket assembly 42 may be defined as a distance between a center point of the chain 44 when engaged on a first of the rear sprockets C1-C12 and a center point of the chain 44 when engaged on an adjacent one of the rear sprockets C1-C12. For example, an outboard sprocket spacing E is defined as an axial distance between the first rear sprocket C1 and the second rear sprocket C2, an inboard sprocket spacing H is defined as an axial distance between the eleventh rear sprocket C11 and the twelfth rear sprocket C12, and a central sprocket spacing G is defined as an axial distance between the fifth rear sprocket C5 and the sixth rear sprocket C6. In an embodiment, each of the outboard, central, and inboard sprocket spacings E, G, H defines a different axial distance. For example, the outboard sprocket spacing E may be greater than the central sprocket spacing G, which may be greater than the inboard sprocket spacing H.

The drive arrangement 18 is configured to shift precisely between adjacent pairs of the rear sprockets C1-C12 when the spacing between sprockets is variable as described above. For example, the control assembly 11 may be configured to control the rear gear changer 48 by a variable axial distance depending on present positioning of the rear gear changer 48.

FIG. 9 also depicts a total range of the rear sprocket assembly 42, as defined by the ratio of an inboard rear sprocket diameter L and an outboard rear sprocket diameter M. The inboard and outboard rear sprocket diameters L, M are defined as pitch diameters of the relevant sprockets C12, C1. A rear sprocket ratio L/M may be tuned for smooth operation and versatile application of the drive arrangement 18. In an embodiment, the rear sprocket ratio L/M is between 5:1 and 5.4:1, inclusive. This rear sprocket ratio L/M may also be expressed as a percentage range, as in 500% to 540%, inclusive.

Figure 10:
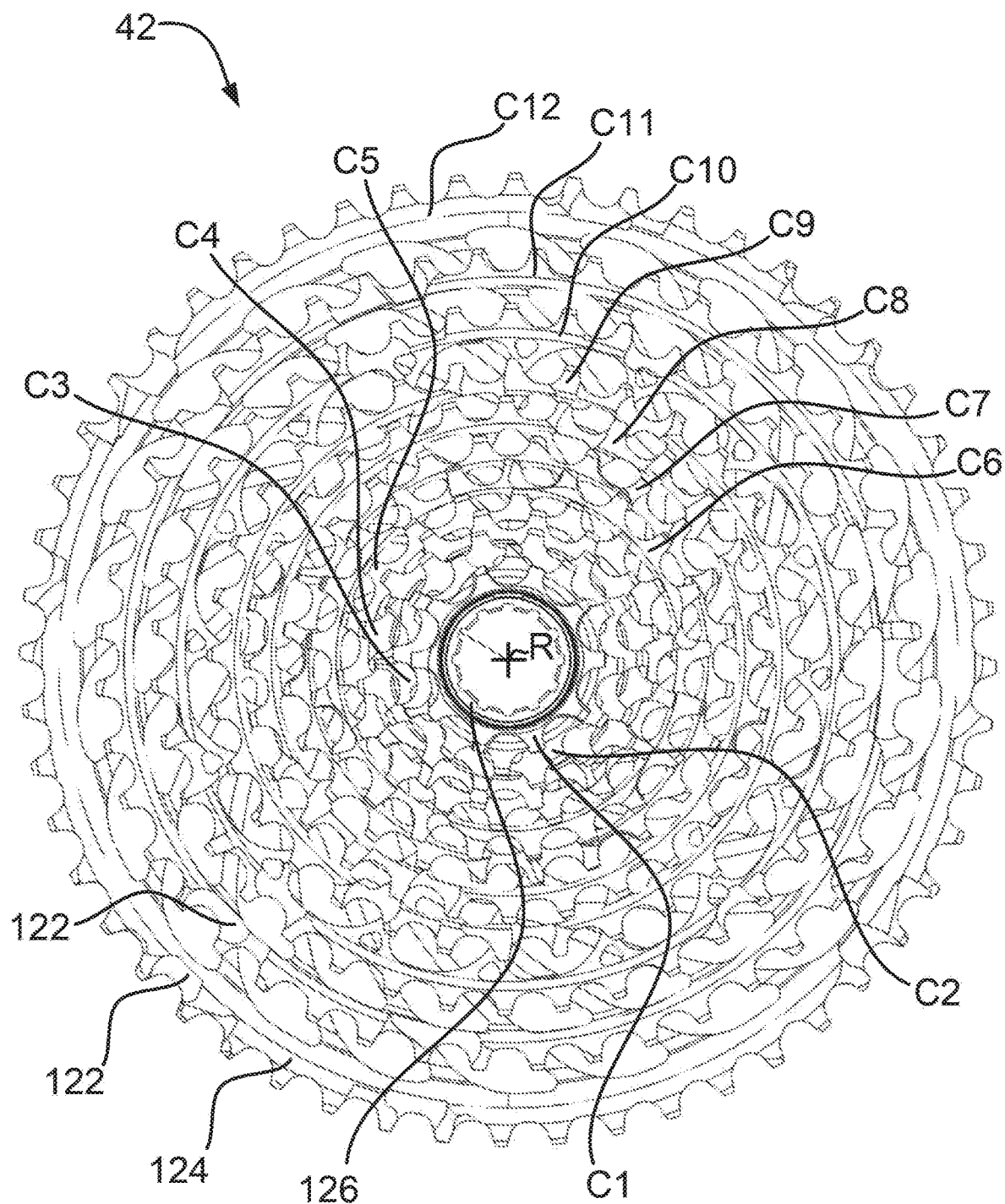
FIG. 10 is a side view of the component of FIG. 8.

FIG. 10 shows a side view of the rear sprocket assembly 42. The rear sprocket assembly 42 includes at least one of a sprocket shifting feature 122. The sprocket shifting feature 122 may be a ramp configuration to interact with the chain 44 when shifting from one of the rear sprockets C1-C11 to a larger adjacent one of the rear sprockets C1-C12. In an embodiment, the sprocket shifting feature 122 may be configured for interaction with the outer link plate 56. For example, the sprocket shifting feature 122 may be sized and shaped to accommodate the outer link plate 56 in a transition position between one of the rear sprockets C1-C11 and the larger adjacent one of the rear sprockets C1-C12.

The rear sprocket assembly 42 may include a sprocket sliding feature 124. The sprocket sliding feature 124 is configured to facilitate a sliding interaction with the twelfth rear sprocket C12 and the rear gear changer 48. The sliding interaction may prevent damage if the rear gear changer 48 contacts the rear sprocket assembly 42 when the bicycle 10 is in motion. The rear gear changer 48 may contact the sprocket sliding feature 124 to prevent the rear gear changer from contacting the rear wheel 16 in an overshift situation from the eleventh rear sprocket C11 to the twelfth rear sprocket C12.

The rear sprocket assembly 42 may include a sprocket securing feature 126. The rear sprocket assembly 42 is configured for attaching to the rear wheel 16. The sprocket securing feature 126 may be a tooled feature. In an embodiment, the sprocket securing feature 126 is configured to accept an installation tool (not shown) and threadably engages with the rear wheel 16. The sprocket securing feature 126 may additionally or alternatively engage with a splined configuration on the rear wheel 16.

Figure 11:
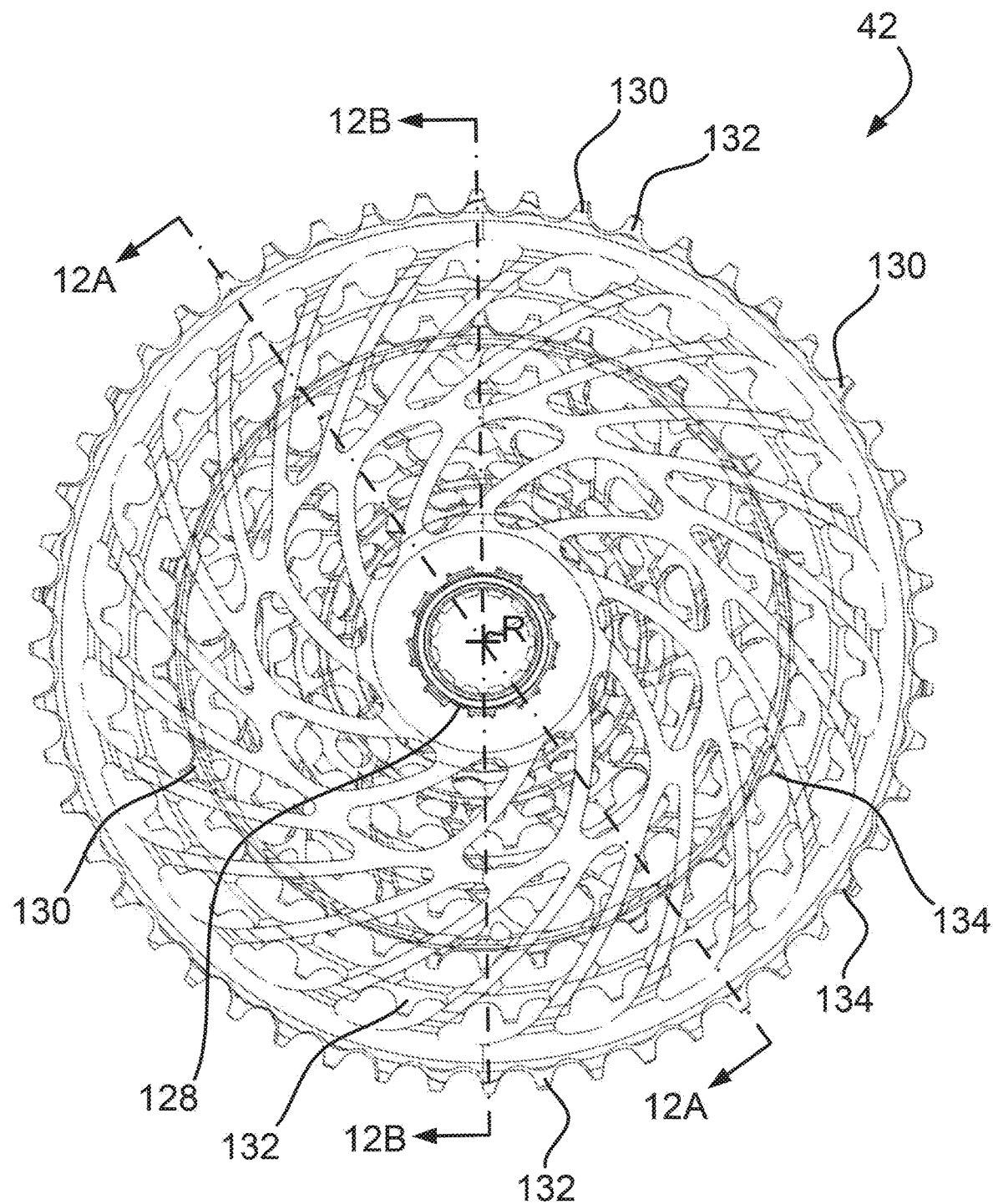
FIG. 11 is a reverse side view of the component of FIG. 8.

FIG. 11 shows another side view of the rear sprocket assembly 42 from the inboard direction. The rear sprocket assembly 42 may include a sprocket engagement feature 128. The sprocket engagement feature 128 is configured for engagement with the rear wheel 16. In an embodiment, the sprocket engagement feature 128 is of a grooved configuration shaped and sized to engage with a splined configuration on the rear wheel 16.

Figure 12A:
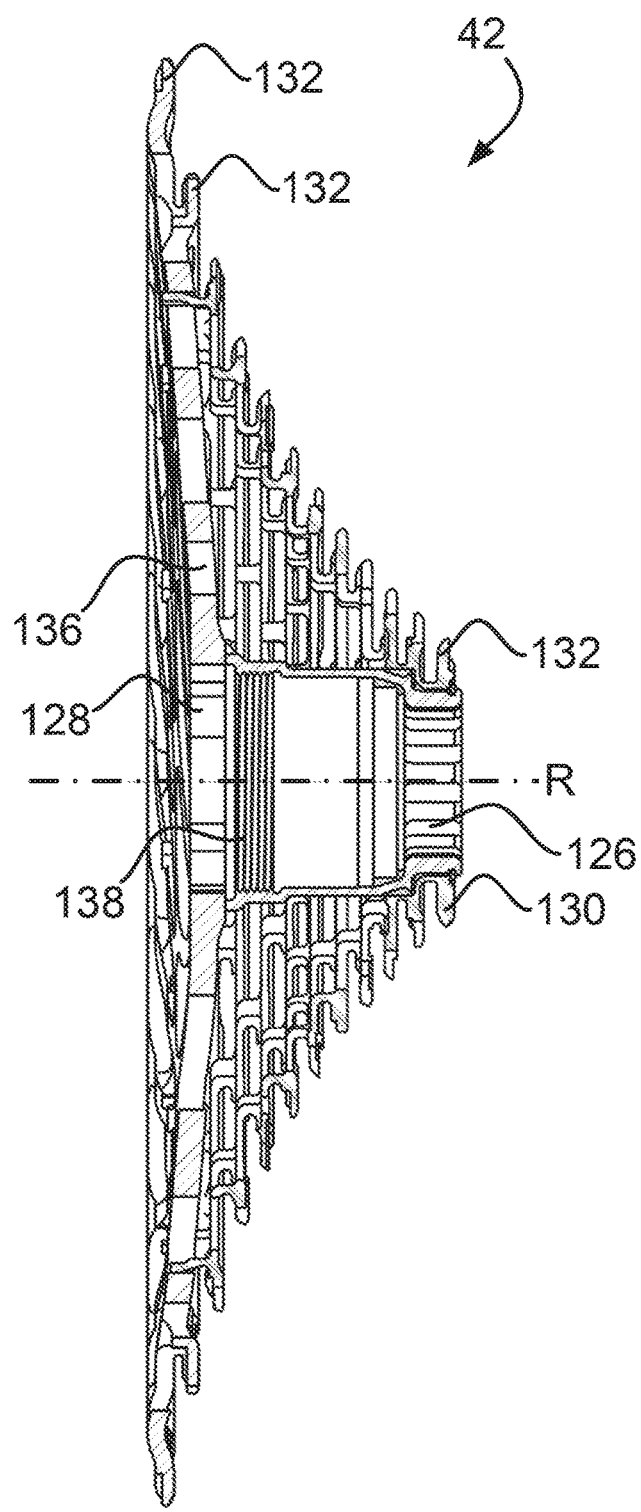
FIG. 12A is a sectional view of the component of FIG. 8 taken along 12A-12A.
Figure 12B:
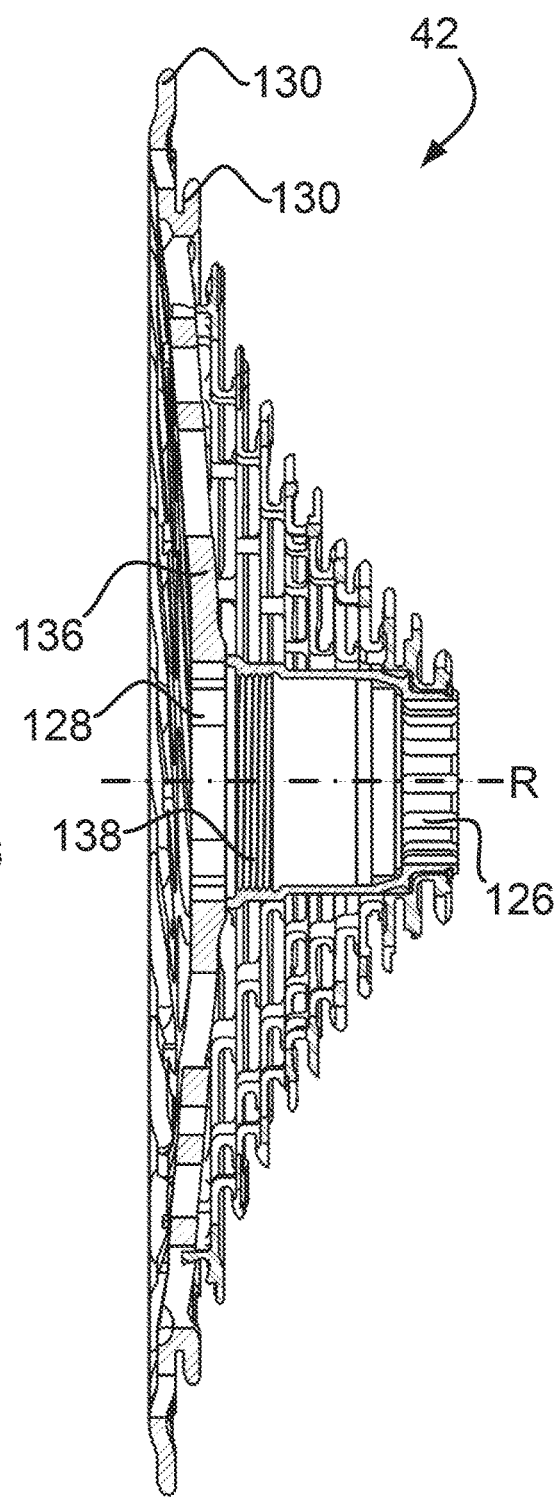
FIG. 12B is a sectional view of the component of FIG. 8 taken along 12B-12B.

FIGS. 12A and 12B show partial sectional views of the rear sprocket assembly 42 taken along lines 12A-12A and 12B-12B of FIG. 11. The rear sprocket assembly 42 includes a sprocket threaded portion 138. The sprocket threaded portion 138 is configured to attach the rear sprocket assembly 42 to the rear wheel 16. The sprocket threaded portion 138 may be separate from other components of the rear sprocket assembly 42. For example, the sprocket threaded portion 138 may be fixed with the sprocket securing feature 126 and rotatable relative to the rear sprockets C1-C12. In an embodiment, the sprocket securing feature 126 is operable with a tool (not shown) to engage the sprocket threaded portion 138 with the rear wheel 16. This engagement may facilitate installation of the rear sprocket assembly 42. For example, the sprocket engagement feature 128 may be pressed on to a corresponding component of the rear wheel 16.

The rear sprocket assembly 42 includes one or more of a thick rear tooth 130. The thick rear tooth 130 may be configured similarly to the thick chainring tooth 60. In an embodiment, the thick rear tooth 130 is axially wider than the inner link gap N of the chain 44 and thus cannot fully engage the inner link 100. The thick rear tooth 130 may guide the chain 44 to a specific orientation on the rear sprocket assembly 42.

The rear sprocket assembly 42 may include a plurality of the thick rear tooth 130. For example, the twelfth sprocket C12 may have an even number of teeth, where half of those teeth are the thick rear teeth 130. In an embodiment, each of the rear sprockets C1-C12 includes the thick rear teeth 130 as half of the total number of teeth on the rear sprocket C1-C12. In this embodiment, each of the rear sprockets C1-C12 has an even total number of teeth.

The rear sprocket assembly 42 may include one or more of a thin rear tooth 132. The thin rear tooth 132 may be similarly configured to the thin chainring tooth 62. In an embodiment, each tooth of the rear sprocket assembly 42 that is not one of the thick rear teeth 130 is one of the thin rear teeth 132. The thin rear teeth 132 may be arranged alternatingly and adjacently between the thick rear teeth 130. In an embodiment, each of the rear sprockets C1-C12 includes an equal number of the thick rear teeth 130 and the thin rear teeth 132.

The rear sprocket assembly 42 may include one or more of a rear sprocket protrusion 134. The rear sprocket protrusions 134 form a portion of the thick rear teeth 130. The rear sprocket protrusions 134 are configured to not interfere with the sprocket shifting features 122. For example, the rear sprocket protrusions 134 each extend axially inboard from one of the rear sprockets C1-C12.

The rear sprocket protrusions 134 forming the thick rear teeth 130 control the chain 44 in a specific orientation. For example, the inner link gap N of the chain 44 may only engage with the thin rear tooth 132. Where one of the sprockets C1-C12 includes an even number of alternating thick rear teeth 130 and thin rear teeth 132, the orientation of the chain 44 with regard to the inner links 100 and the outer links 102 will remain consistent relative to the rear sprocket assembly 42.

Specific orientation of the inner links 100 and the outer links 102 relative to the rear sprocket assembly 42 facilitates specialized features of the drive arrangement 18. For example, the sprocket shifting feature 122 may be sized and shaped for interaction with a specific one of the inner links 100 and the outer links 102. In an embodiment, each of the sprocket shifting features 122 is configured for interaction with the outer links 102 of the chain 44.

The eleventh rear sprocket C11 may be sized and shaped to facilitate various operations of the drive arrangement 18. For example, the eleventh rear sprocket C11 may be sized by a specific proportion smaller than the twelfth rear sprocket C12. The eleventh rear sprocket C11 may facilitate interaction of the sprocket sliding feature 124 on the twelfth sprocket C12 with the rear gear changer 48 as discussed above.

The rear sprocket assembly 42 may include a sprocket base portion 136. The sprocket base portion 136 is configured to support relatively high levels of torque input through large sprockets, for example the eleventh rear sprocket C11 and the twelfth rear sprocket C12. The sprocket base portion 136 may be a separate subcomponent of the rear sprocket assembly 42. For example, the sprocket base portion 136 may be pinned, welded, and/or press-fit with the tenth rear sprocket C10. FIGS. 13A and 13B depict the sprocket base portion 136 separately from the rest of the rear sprocket assembly 42. The sprocket base portion 136 may be configured for lateral stiffness. For example, the sprocket base portion 136 may have a relatively thick cross-section compared to other portions of the rear sprocket assembly 42.

Figure 14:
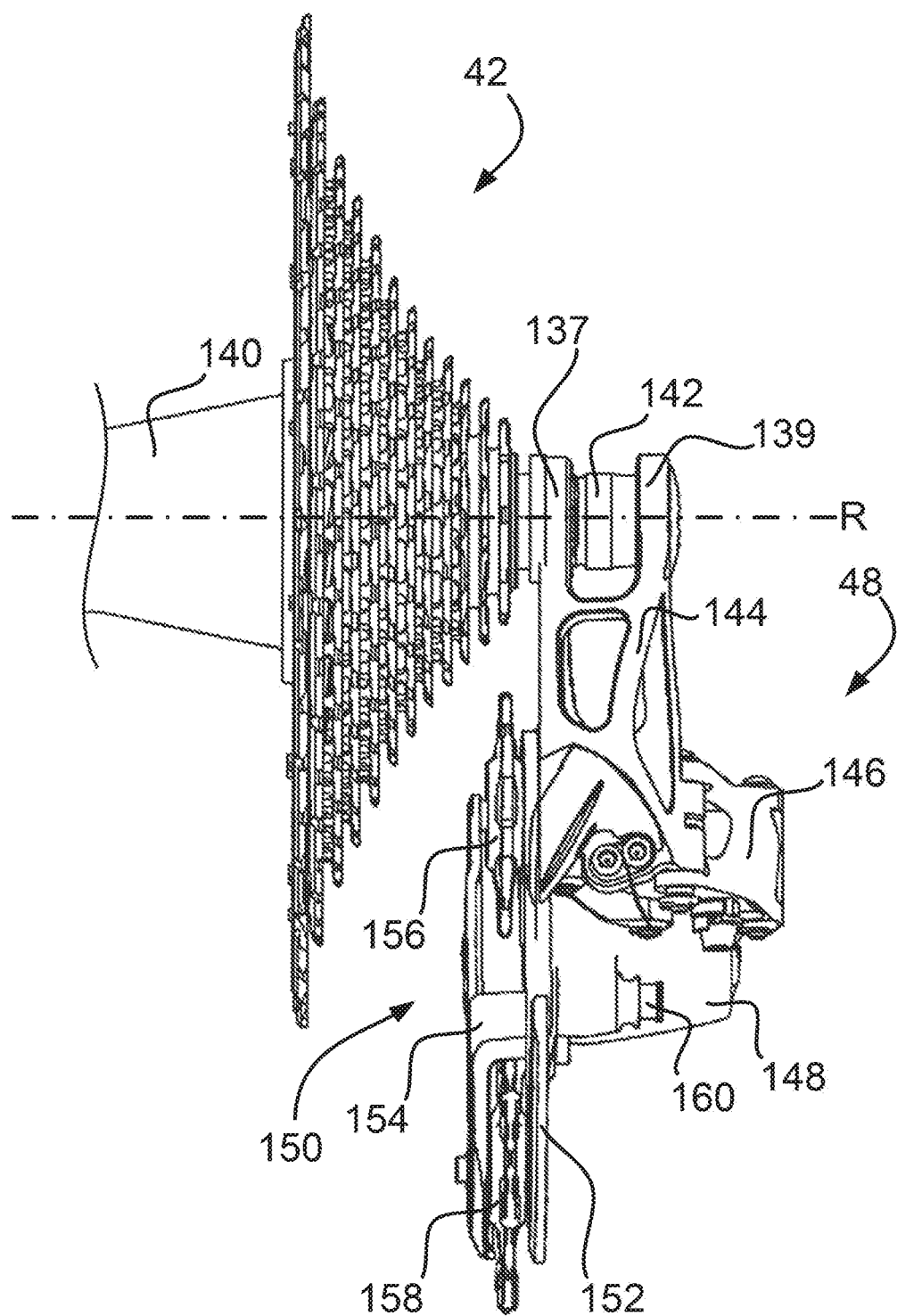
FIG. 14 is an end view of components of the drive arrangement of FIG. 2.

FIG. 14 depicts an end view of the rear sprocket assembly 42 and the rear gear changer 48. A rear hub 140 of the rear wheel 16 is also shown to support the drive arrangement 18. The rear hub 140 includes a plurality of spoke holes 141 for engaging spokes (not shown) of the rear wheel 16. The rear gear changer 48 is mounted axially outboard of the rear sprocket assembly 42.

The gear changer mounting unit 144 is shown to include a mounting unit inboard portion 137 and a mounting unit outboard portion 139. The mounting unit inboard portion 137 is spaced apart from the mounting unit outboard portion 139 along the rear axis R. The mounting unit inboard portion 137 is configured for mounting inboard of the frame 12 along the rear axis R and the mounting unit outboard portion 139 is configured for mounting outside the frame 12 along the rear axis R.

The rear gear changer 48 is secured as part of the drive arrangement 18 with an axle end portion 142. The axle end portion 142 secures a gear changer mounting unit 144. The axle end portion 142 may include an end portion installation feature 143. The end portion installation feature 143 may be a tooled fitting such as a hexagonal female fitting. The gear changer mounting unit 144 connects to a gear changer linkage 146. The gear changer linkage 146 is movable relative to the gear changer mounting unit 144 and connects to a movable member 148. A gear changer cage portion 150 is rotatably connected to the movable member 148. The gear changer cage portion 150 includes an outboard cage member 152 connected to an inboard cage member 154. A first gear changer wheel 156 and a second gear changer wheel 158 are rotatably connected between the outboard and inboard cage members 152, 154 and configured to engage the chain 44. A gear changer lock 160 may also be provided to rotationally lock the gear changer cage portion 150 relative to the movable member 148.

The rear gear changer 48 has at least an adjustment state and an installed state. In the adjustment state, the gear changer mounting unit 144 is not fully secured and may be rotationally adjusted about the rear axis R. This adjustment state may be used to rotationally align the rear gear changer 48 for proper tension of the chain 44. For example, tension of the chain 44 may affect shifting performance by determining how radially close the first gear changer wheel 156 is to each of the rear sprockets C1-C12 during engagement.

In the installed state, the gear changer mounting unit 144 is rotationally fixed relative to the frame 12. In this state, the radial travel of the first gear changer wheel 156 relative to the rear axis R is determined only by pivoting about a cage pivot 176.

The cage pivot 176 may be configured to control movement of the rear gear changer. For example, the cage pivot 176 may be of a damper configuration to reduce chain slap as understood in the art. The cage pivot 176 may be configured to resist movement in one direction and to facilitate free movement in another direction.

Figure 15:
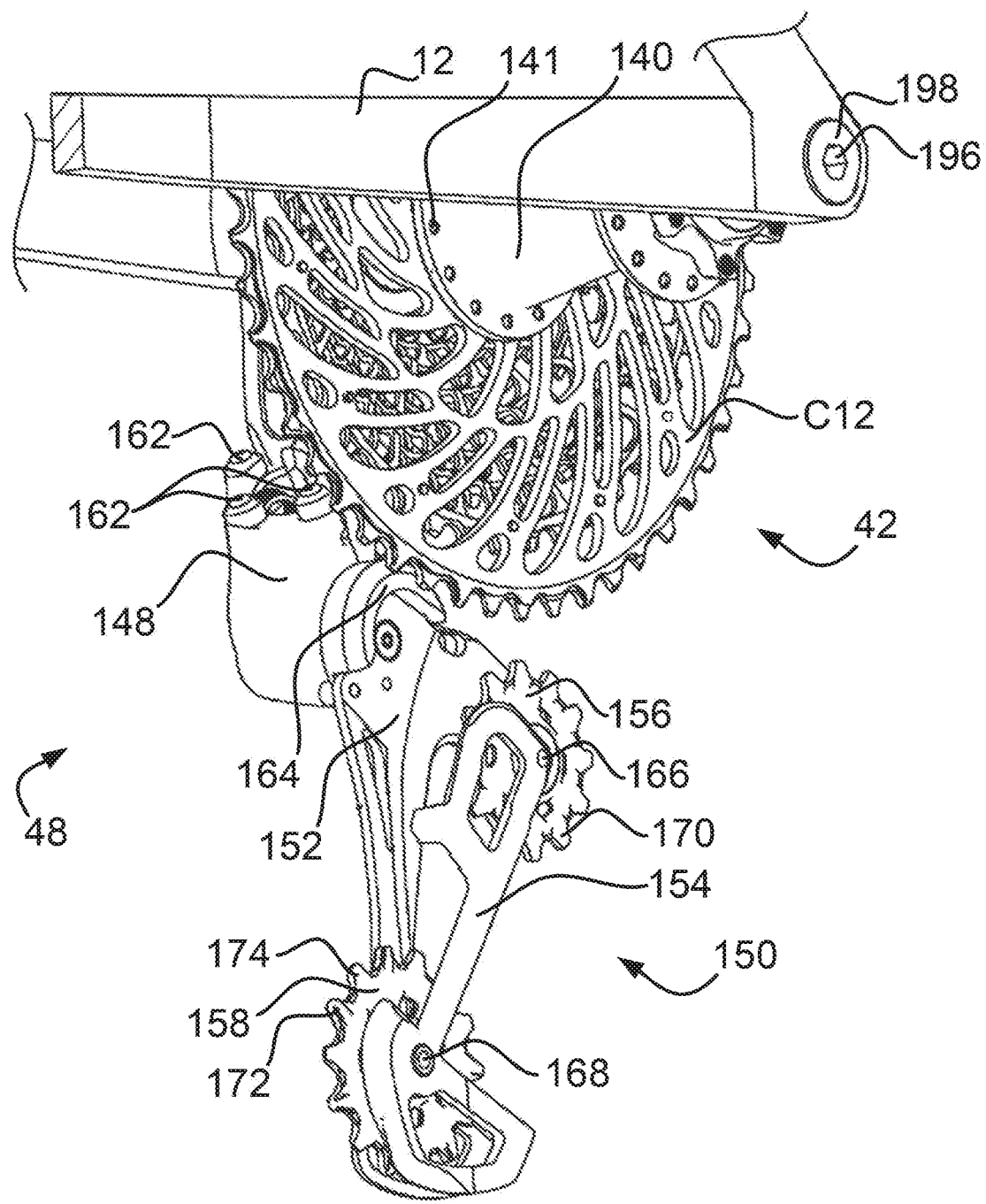
FIG. 15 is an isometric view of components of the drive arrangement of FIG. 2.

FIG. 15 is an inboard isometric view of the components shown in FIG. 14 attached to the frame 12. One or more of a linkage axle 162 may be provided to facilitate movement of the movable member 148 relative to the gear changer mounting unit 144 through the gear changer linkage 146. FIG. 15 depicts a plurality of the linkage axles 162 to move a parallelogram configuration of the gear changer linkage 146. The parallelogram configuration is configured to maintain consistent radial positioning of the movable member 148 and the gear changer cage portion 150 throughout axial movement of the movable member 148.

The movable member 148 is configured to move responsive to user actuation. The movement of the movable member 148 facilitates movement of the chain 44 between the rear sprockets C1-C12 of the rear sprocket assembly 42.

A gear changer sliding feature 164 is attached to the movable member 148. The gear changer sliding feature 164 is configured to interact with the drive arrangement to prevent inboard overshifting of the rear gear changer 48. For example, the gear changer sliding feature 164 may interact with the sprocket sliding feature 124 to stop inboard movement of the movable member 148. Inboard movement may be stopped at a point equal to or past a point of engagement of the chain 44 with the twelfth sprocket C12.

The gear changer sliding feature 164 may be additionally or alternatively connected to the outboard cage member 152. The outboard cage member 152 and the inboard cage member 154 accept installation of a first wheel axle 166 and a second wheel axle 168. The first wheel axle 166 is configured to rotatably mount the first gear changer wheel 156. The second wheel axle 168 is configured to rotatably mount the second gear changer wheel 158.

The first gear changer wheel 156 is configured for interaction with outside portions of the chain 44. For example, the first gear changer wheel 156 includes a plurality of first wheel teeth 170 sized and shaped to interact with at least one of the outside inner plat portion 114, the outside outer reduced beveled portion 118, and the outside outer flat portion 120. The first wheel teeth 170 may be relatively short in comparison to other teeth of the drive arrangement 18. For example, the first wheel teeth 170 may have a smaller radial height measured from the first wheel axle 166 compared to a radial height of the teeth 60, 61, 62 of the chainring 52 relative to the front axis F.

The second gear changer wheel 158 is configured for interaction with inside portions of the chain 44. For example, the second gear changer wheel 158 may include a plurality of thick second wheel teeth 172 and a plurality of thin second wheel teeth 174. The plurality of thick second wheel teeth 172 may be configured similarly to the thick chainring tooth 60 and the plurality of thin second wheel teeth 174 may be configured similarly to the thin chainring tooth 62. For example, the plurality of thick second wheel teeth 172 may be configured to not engage in the inner link gap N to maintain consistent orientation of the chain 44 relative to the second gear changer wheel 158, with regard to inner and outer links 100, 102.

FIG. 14 illustrates the coaxial relationship between the rear gear changer 48 and the rear sprocket assembly 42. The gear changer mounting unit 144 is mounted with the axle end portion 142 about the rear axis R. The rear gear changer 48 maintains a consistent radial distance from a point on the rear sprocket assembly 42 regardless of rotational positioning of the gear changer mounting unit 144.

The first gear changer wheel 156 maintains a consistent radial distance to each of the rear sprockets C1-C12 as a function of length of the chain 44. For example, as the movable member 148 moves inboard to a larger one of the rear sprockets C2-C12, the chain 44 will be moved to encompass a greater number of teeth and the gear changer cage portion 150 will pivot to allow a straighter path for the chain 44.

Figure 16:
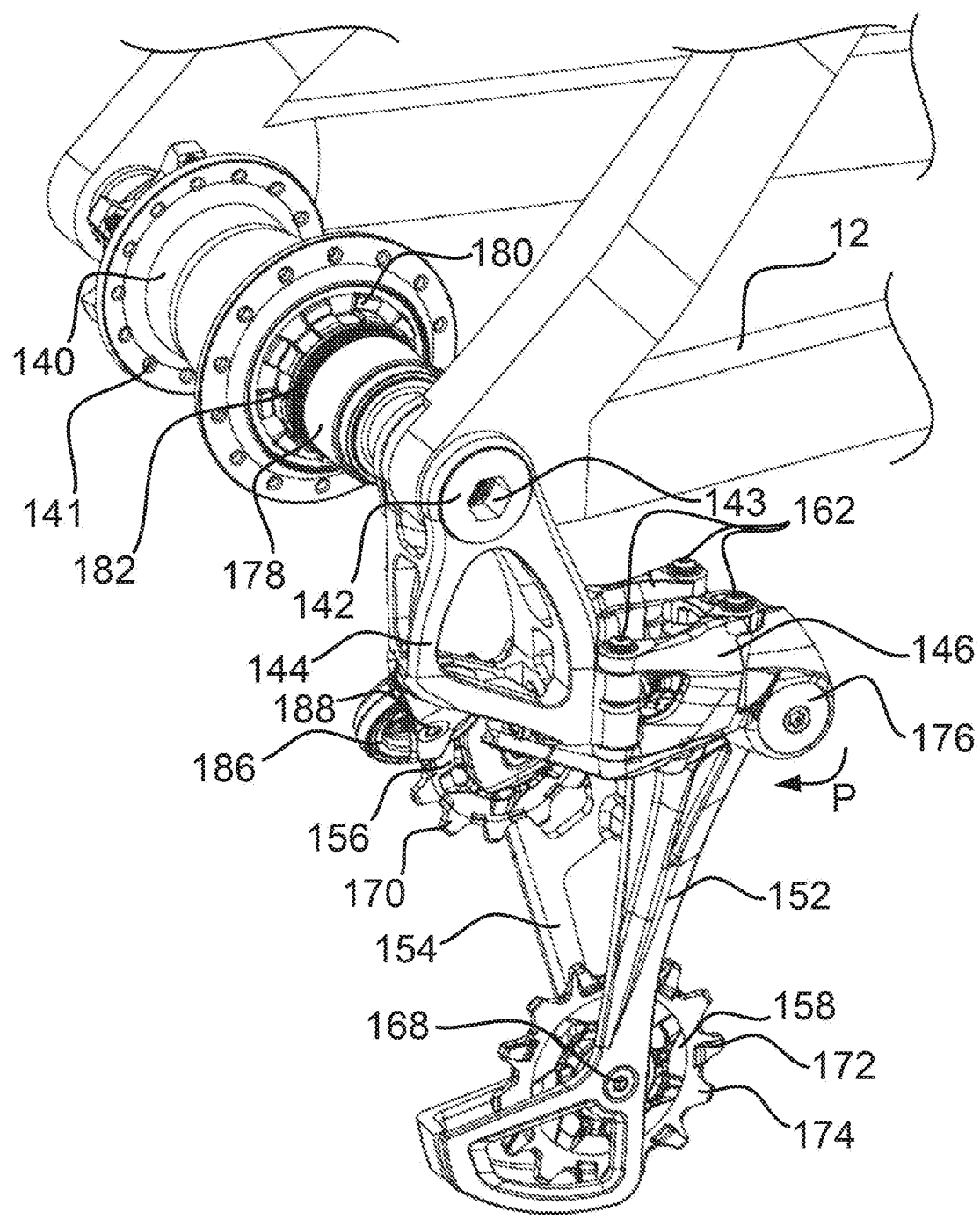
FIG. 16 is an isometric view of components of the drive arrangement of FIG. 2.
Figure 17:
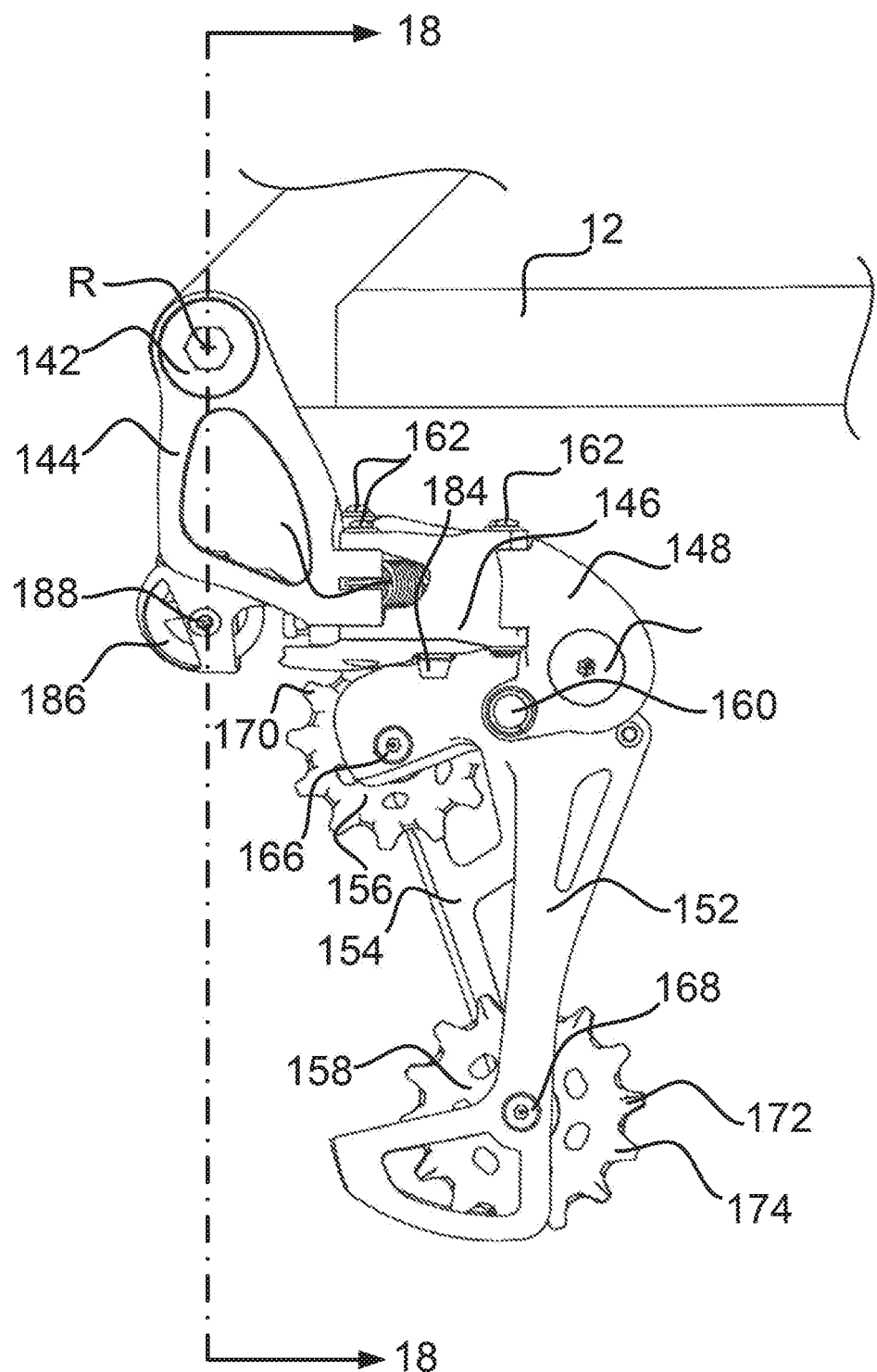
FIG. 17 is a side view of components of the drive arrangement of FIG. 2.

As shown in FIG. 16, the gear changer cage portion 150 pivots about the cage pivot 176. The cage pivot provides a bias force in a bias direction P to provide tension on the chain 44 between the second gear changer wheel 158 and the chainring 52. The gear changer cage portion 150 is configured to move the first gear changer wheel 156 radially closer to rear axis R as the gear changer cage portion 150 moves in the bias direction P, increasing the length of the chain 44 between the second gear changer wheel 158 and the chainring 52. As the chain 44 is shifted from a smaller one of the rear sprockets C1-C11 to a larger one of the rear sprockets C2-C12, the first gear changer wheel 156 moves radially further from the rear axis R.

The drive arrangement 18 is tuned so that the movement of the second gear changer wheel 158, dependent on length of the chain 44 and the sizes of the rear sprockets C1-C12, corresponds to a set distance between the second gear changer wheel 158 and the one of the rear sprockets C1-C12 with which it is axially aligned.

The gear changer mounting unit 144 is configured to mount on inboard and outboard sides of the frame 12 to facilitate rigidity of the rear gear changer 48. The drive arrangement 18 may employ smaller sprocket spacings E, G, H as rigidity of the rear gear changer 48 and thus precise location of the chain 44 increases.

Precise location of the chain 44 may also be facilitated by axial location of the rear sprocket assembly 42 relative to the rear gear changer 48 without consideration of the frame 12 and any tolerances thereof. As shown in FIG. 16, an attachment body 178 is attached to the rear hub 140. The attachment body 178 is sized and shaped to accept the rear sprocket assembly 42. The rear hub 140 and the rear gear changer 48 axially locate from one another regardless of specific dimensions of the frame 12.

The attachment member 178 includes features to engage corresponding features of the rear sprocket assembly 42. For example, the attachment member 178 may include a hub engagement feature 180 for engaging the sprocket engagement feature 128. The attachment member 178 may include an attachment threaded portion 182 for engaging the sprocket threaded portion 138.

The rear gear changer 48 may be controlled through cable actuation. For example, the movable member 148 may include a cable mount 184 for securing an actuation cable (not shown). Cable routing may be accomplished through a cable pulley 186 attached with a pulley axle 188. Accurate actuation of the rear gear changer 48 may be facilitated through relatively rigid mounting of the cable pulley 186 on the gear changer mounting unit 144. The cable (not shown) is controlled through the control assembly 11. The rear gear changer 48 may also be controlled by an electronic system. For example, the rear gear changer 48 may be controlled by a wired or wireless electronic configuration of the control assembly 11.

Figure 18:
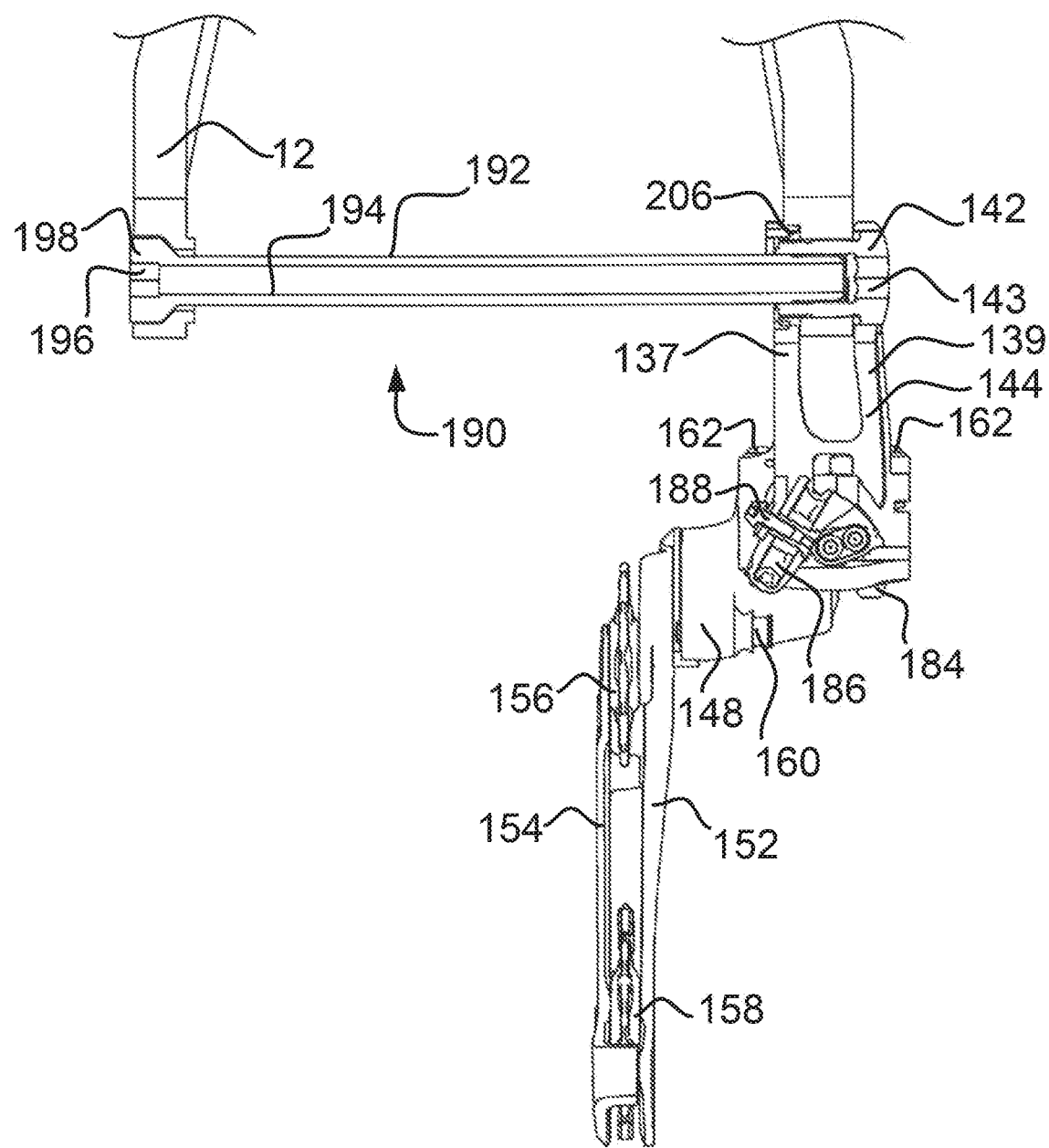
FIG. 18 is a partial sectional view of components of the drive arrangement of FIG. 17 taken along 18-18.

FIG. 18 shows a partial sectional end view of the rear gear changer 48 and an axle assembly 190. The axle assembly 190 includes the axle end portion 142, secured with an axle body 192. The axle body 192 may be hollow, including an axle inside wall 194. The axle assembly body 192 is installed with the axle end portion 142 with a body installation feature 196. The body installation feature 196 may be a tooled interface, similar to the end portion installation feature 143, and may be formed in an axle head 198.

Figure 19:
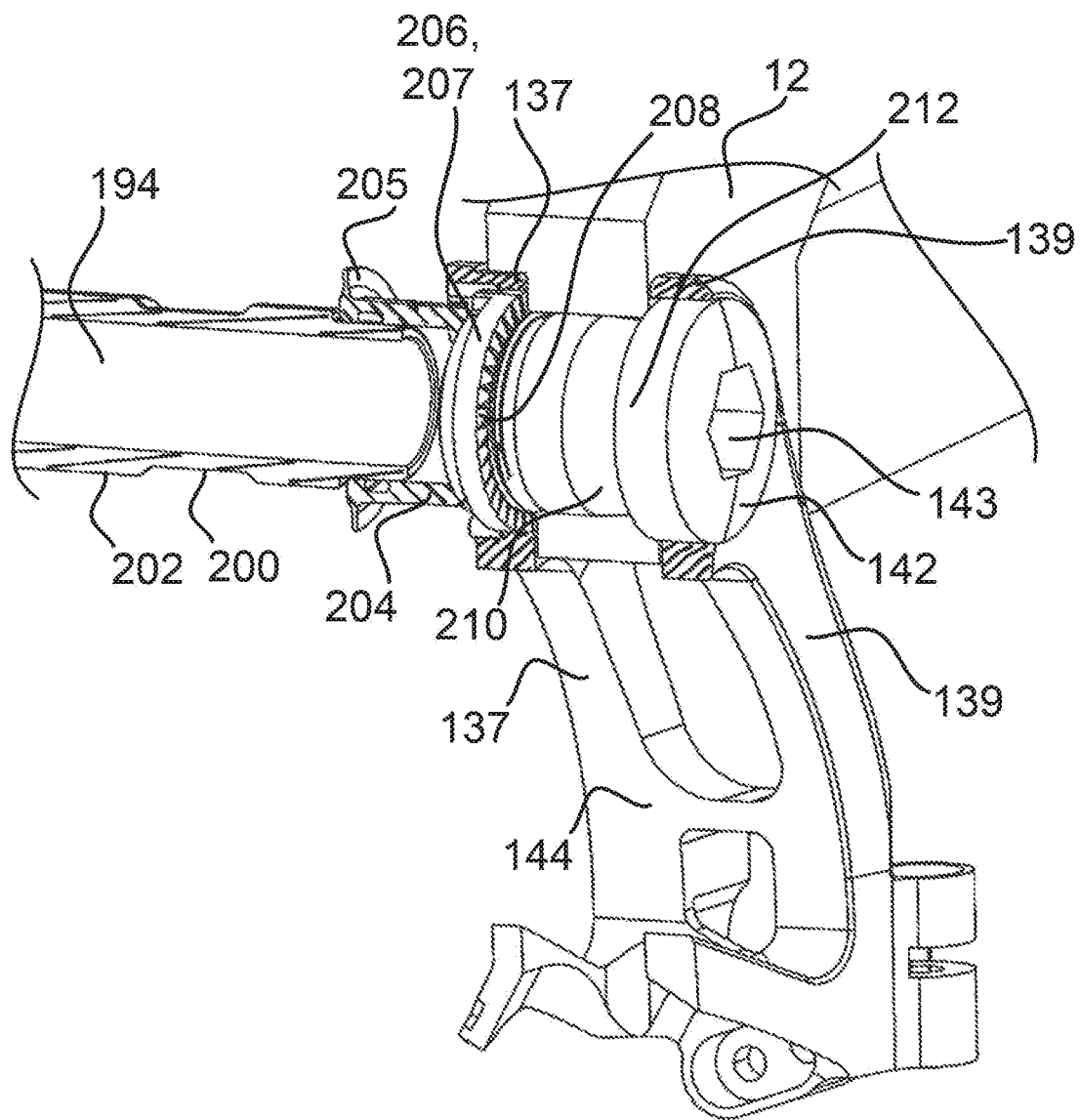
FIG. 19 is a partial sectional view of components of the drive arrangement of FIG. 17 taken along 18-18.

FIG. 19 shows an enlarged view of the gear changer mounting unit 144 and associated components. The view of FIG. 19 differs from the view of FIG. 18 in that the axle body 192 is shown with an axle recess 200. The axle recess 200 may be weight saving measure with minimal impact on system stiffness. A bearing surface 202 for mounting the rear hub 140 remains non-recessed on the axle body 192.

An end lock 206 is provided for securing the axle end portion 142. The end lock 206 includes a locking portion 208 configured to engage the frame 12. The end lock 206 installs with the axle end portion 142 to secure the gear changer mounting unit 144 to the frame 12. The axle end portion 142 includes a frame engagement surface 210 for engaging the frame 12. The frame engagement surface 210 may be a clearance fit with the frame 12 and maintain the coaxial relationships described above as the axle end portion 142 directly locates the gear changer mounting unit 144 with a mount engagement surface 212. Similarly, the end lock 206 locates the gear changer mounting unit 144 directly with a lock engagement surface 207.

An anti-jam feature 204 may be included to accommodate the chain 44 in the case of outboard derailment. The anti-jam feature 204 spans between the rear sprocket assembly 42 and the gear changer mounting unit 144 and has an axial dimension larger than that of the chain 44. Thus, the chain 44 may slide over the anti-jam feature 204 in the case of derailment. The anti-jam feature 204 may include a jam lip 205. The jam lip 205 limits axially inboard movement of the chain 44 in the case of derailment onto the anti-jam feature 204.

Figure 20:
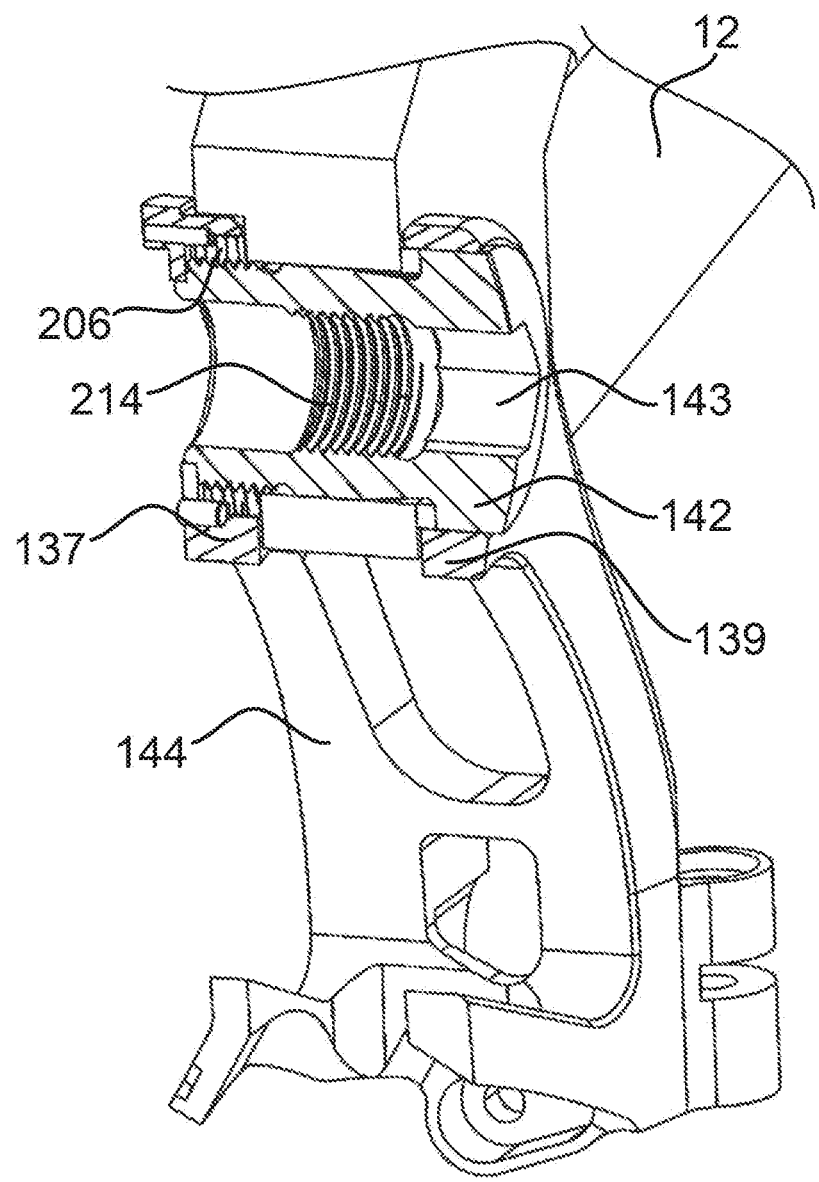
FIG. 20 is a partial section view of components of the drive arrangement of FIG. 17 taken along 18-18.

As shown in FIG. 20, the axle end portion 142 includes an end portion threading 214 configured to engage with the axle body 192. The end portion threading 214 is configured such that, when the axle end portion 142 is installed with the end lock 206, the axle body 192 may be installed with the body installation feature 196.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A drive arrangement for a bicycle comprising:
a crank arm having a crank mounting portion;
a single front drive sprocket having a front chain engaging portion and a front sprocket mounting portion attached to the crank mounting portion;
an axle assembly having an axle body and an axle end portion, wherein the axle body is configured to attach with the axle end portion;
a plurality of rear sprockets located about an axis of the axle body;
a chain configured to engage with the front chain engaging portion of the front sprocket and the plurality of rear sprockets, the chain comprising a plurality of inner links alternately arranged with a plurality of outer links, wherein each of the plurality of outer links includes an outside flat portion;
a gear changer having a gear changer mounting unit located about the axis of the axle body and having an inboard portion mounted axially inboard of a frame of the bicycle and an outboard portion mounted axially outboard of the frame of the bicycle, the gear changer configured to move the chain between an axially innermost rear sprocket and an axially outermost rear sprocket of the plurality of rear sprockets; and
a control unit configured to control movement of the gear changer;
wherein the crank mounting portion is axially aligned closer to the axially outermost rear sprocket than to the axially innermost rear sprocket;
the front chain engaging portion is axially aligned inboard of the crank mounting portion;
the sing front drive sprocket comprises a plurality of thick, tall front teeth;
the plurality of outer links are configured to interact with the plurality of thick, tall front teeth and the plurality of inner links are configured to interact with a plurality of thin front teeth interposed between the plurality of thick, tall front teeth;
a majority of the plurality of rear sprockets comprise a plurality of thick rear teeth configured to interact with the plurality of outer links of the chain and a plurality of thin rear teeth configured to interact with the plurality of inner links of the chain;
the inboard portion of the gear changer mounting unit is shaped and sized to contact the axle assembly such that the inboard portion is axially engaged with an outboard portion of the axle assembly;
the inboard portion and the outboard portion of the gear changer mounting unit are shaped and sized to accept the axle assembly to resist forces imparted to the gear changer; and
the control unit is configured to control the gear changer to move by a shift increment.

2. The drive arrangement of claim 1, wherein each of the plurality of inner links of the chain comprises an outside portion having a non-recessed configuration.

3. The drive arrangement of claim 1, wherein the chain is configured to radially cover the plurality of thick, tall teeth of the front sprocket with the outside flat portion of the plurality of outer links of the chain.

4. The drive arrangement of claim 3, wherein the gear changer further comprises a first pulley configured to interact with the outside portion of the chain.

5. The drive arrangement of claim 4, wherein the first pulley comprises short pulley teeth.

6. The drive arrangement of claim 5, wherein the gear changer mounting unit is rotatable about the axis of the axle in an adjustment state such that the first pulley maintains a consistent radial distance to the plurality of rear sprockets.

7. The drive arrangement of claim 1, wherein the gear changer further comprises an inboard cage member and an outboard cage member, the outboard cage member shaped and sized to axially engage the axially innermost rear sprocket to limit inboard axial travel of the gear changer.

8. The drive arrangement of claim 1, wherein the plurality of thick, tall front teeth consists of an even number and wherein each of the plurality of thick, tall front teeth is arranged alternatingly between the plurality of thin front teeth.

9. The drive arrangement of claim 1, wherein the plurality of thick rear teeth consists of an even number and wherein each of the plurality of thick rear teeth is arranged alternatingly between the plurality of thin rear teeth.

10. The drive arrangement of claim 1, wherein the plurality of thick rear teeth each comprise an axial rear tooth protrusion extending axially inboard.

11. The drive arrangement of claim 1, wherein the plurality of thick, tall front teeth each have an axially asymmetric configuration, sized and shaped to facilitate engagement of the plurality of thick, tall front teeth when the chain is engaged with the axially innermost rear sprocket.

12. The drive arrangement of claim 1, wherein the gear changer mounting unit is rotationally fixed relative to the axle assembly in an installed state.

13. The drive arrangement of claim 12, wherein a chain engaging portion of the gear changer remains at a fixed radial distance relative to the plurality of rear sprockets during rotation of the gear changer mounting unit in an adjustment state.

14. The drive arrangement of claim 1, wherein the plurality of rear sprockets has a rear sprocket ratio range of between and including 500-540%.

* * * * *